United States Patent
Koval et al.

(10) Patent No.: US 11,863,589 B2
(45) Date of Patent: *Jan. 2, 2024

(54) ENTERPRISE SECURITY IN METERS

(71) Applicant: EI ELECTRONICS LLC, Westbury, NY (US)

(72) Inventors: Luna A. Koval, Commack, NY (US); Erran Kagan, Great Neck, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 519 days.

This patent is subject to a terminal disclaimer.

(21) Appl. No.: 16/895,043

(22) Filed: Jun. 8, 2020

(65) Prior Publication Data
US 2020/0389499 A1 Dec. 10, 2020

Related U.S. Application Data

(60) Provisional application No. 62/858,586, filed on Jun. 7, 2019.

(51) Int. Cl.
*H04L 9/40* (2022.01)
*G01R 22/06* (2006.01)
*H04L 9/36* (2006.01)
*H04L 9/32* (2006.01)
*H04L 12/18* (2006.01)
*H02J 13/00* (2006.01)
*H04L 61/4523* (2022.01)

(52) U.S. Cl.
CPC ......... *H04L 63/20* (2013.01); *G01R 22/063* (2013.01); *G01R 22/066* (2013.01);
(Continued)

(58) Field of Classification Search
CPC ..... H04L 63/20; H04L 63/083; H04L 63/102; H04L 63/104; H04L 63/108;
(Continued)

(56) References Cited

U.S. PATENT DOCUMENTS 2,883,255 A 4/1959 Anderson
2,987,704 A 6/1961 Gimpel et al.
(Continued)

FOREIGN PATENT DOCUMENTS

CN 101799681 A 8/2010
CN 111444240 A 7/2020
(Continued)

OTHER PUBLICATIONS

Xia et al. 2018 IEEE Access, "Secure Session Key Management Scheme for Meter-Reading System Based on LoRa Technology", pp. 75015-75024 (Year: 2018).*
(Continued)

*Primary Examiner* — Khalil Naghdali
(74) *Attorney, Agent, or Firm* — Robinson & Cole LLP

(57) ABSTRACT

The present disclosure provides for enterprise security in intelligent electronic devices such as electric power meters. In accordance with the present disclosure, enterprise security is a security system in which each individual device, instead of configuring and storing security configurations locally, use a security server for security verifications. Such a security server of the present disclosure may be a dedicated computer on a network, that is used to manage the security configuration for all users. This makes it simpler for administrators to configure users and devices, which in turn improves security by encouraging security to be properly configured.

25 Claims, 9 Drawing Sheets

(52) U.S. Cl.
CPC ........ *H02J 13/00002* (2020.01); *H04L 9/321* (2013.01); *H04L 9/3247* (2013.01); *H04L 9/3268* (2013.01); *H04L 9/36* (2013.01); *H04L 12/1895* (2013.01); *H04L 61/4523* (2022.05); *H04L 63/083* (2013.01); *H04L 63/102* (2013.01); *H04L 63/104* (2013.01); *H04L 63/108* (2013.01); *H04L 63/1425* (2013.01)

(58) Field of Classification Search
CPC ... H04L 63/1425; H04L 9/321; H04L 9/3247; H04L 9/3268; H04L 9/36; H04L 12/1895; H04L 61/4523; H02J 13/00002; G01R 22/063; G01R 22/0066
USPC ........................................................ 713/175
See application file for complete search history.

(56) References Cited

U.S. PATENT DOCUMENTS

| | | |
|---|---|---|
| 3,142,820 A | 7/1964 | Daniels |
| 3,453,540 A | 7/1969 | Dusheck, Jr. |
| 3,824,441 A | 7/1974 | Heyman et al. |
| 4,246,623 A | 1/1981 | Sun |
| 4,466,071 A | 8/1984 | Russell |
| 4,489,386 A | 12/1984 | Breddan |
| 4,884,021 A | 11/1989 | Hammond et al. |
| 4,996,646 A | 2/1991 | Farrington |
| 5,014,229 A | 5/1991 | Mofachern |
| 5,166,887 A | 11/1992 | Farrington et al. |
| 5,170,360 A | 12/1992 | Porter et al. |
| 5,185,705 A | 2/1993 | Farrington |
| 5,212,441 A | 5/1993 | McEachern et al. |
| 5,224,054 A | 6/1993 | Wallis |
| 5,233,538 A | 8/1993 | Wallis |
| 5,237,511 A | 8/1993 | Caird et al. |
| 5,298,854 A | 3/1994 | McEachern et al. |
| 5,298,855 A | 3/1994 | McEachern et al. |
| 5,298,856 A | 3/1994 | McEachern et al. |
| 5,298,859 A | 3/1994 | McEachern et al. |
| 5,298,885 A | 3/1994 | McEachern et al. |
| 5,298,888 A | 3/1994 | McEachern et al. |
| 5,300,924 A | 4/1994 | McEachern et al. |
| 5,301,122 A | 4/1994 | Halpern |
| 5,302,890 A | 4/1994 | McEachern et al. |
| 5,307,009 A | 4/1994 | McEachern et al. |
| 5,315,527 A | 5/1994 | Beckwith |
| 5,347,464 A | 9/1994 | McEachern et al. |
| 5,544,064 A | 8/1996 | Beckwith |
| 5,559,719 A | 9/1996 | Johnson et al. |
| 5,574,654 A | 11/1996 | Bingham et al. |
| 5,581,173 A | 12/1996 | Yalla et al. |
| 5,706,204 A | 1/1998 | Cox et al. |
| 5,724,556 A | 3/1998 | Souder et al. |
| 5,764,523 A | 6/1998 | Yoshinaga et al. |
| 5,774,366 A | 6/1998 | Beckwith |
| 5,796,977 A | 8/1998 | Sarangdhar et al. |
| 5,801,643 A | 9/1998 | Williams et al. |
| 5,819,203 A | 10/1998 | Moore et al. |
| 5,822,165 A | 10/1998 | Moran |
| 5,832,210 A | 11/1998 | Akiyama et al. |
| 5,874,903 A | 2/1999 | Shuey et al. |
| 5,898,387 A | 4/1999 | Davis et al. |
| 5,899,960 A | 5/1999 | Moore et al. |
| 5,986,574 A | 11/1999 | Colton |
| 6,018,690 A | 1/2000 | Saito et al. |
| 6,028,857 A | 2/2000 | Poor |
| 6,038,516 A | 3/2000 | Alexander et al. |
| 6,073,169 A | 6/2000 | Shuey et al. |
| 6,098,175 A | 8/2000 | Lee |
| 6,100,817 A | 8/2000 | Mason, Jr. et al. |
| 6,121,593 A | 9/2000 | Mansbery et al. |
| 6,151,653 A | 11/2000 | Lin et al. |
| 6,157,329 A | 12/2000 | Lee et al. |
| 6,167,329 A | 12/2000 | Engel et al. |
| 6,195,614 B1 | 2/2001 | Kochan |
| 6,279,037 B1 | 8/2001 | Tams et al. |
| 6,289,267 B1 | 9/2001 | Alexander et al. |
| 6,343,299 B1 | 1/2002 | Huang et al. |
| 6,393,458 B1 | 5/2002 | Gigliotti et al. |
| 6,396,839 B1 | 5/2002 | Ardalan et al. |
| 6,405,128 B1 | 6/2002 | Bechtolsheim et al. |
| 6,437,692 B1 | 8/2002 | Petite et al. |
| 6,487,457 B1 | 11/2002 | Hull et al. |
| 6,493,644 B1 | 12/2002 | Jonker et al. |
| 6,496,511 B1 | 12/2002 | Wang et al. |
| 6,519,537 B1 | 2/2003 | Yang |
| 6,528,957 B1 | 3/2003 | Luchaco |
| 6,560,608 B1 | 5/2003 | Tomm et al. |
| 6,564,332 B1 | 5/2003 | Nguyen et al. |
| 6,565,608 B1 | 5/2003 | Fein et al. |
| 6,615,147 B1 | 9/2003 | Jonker et al. |
| 6,636,030 B1 | 10/2003 | Rose et al. |
| 6,657,552 B2 | 12/2003 | Belski et al. |
| 6,671,654 B1 | 12/2003 | Forth et al. |
| 6,671,802 B1 | 12/2003 | Ott |
| 6,717,394 B2 | 4/2004 | Elms |
| 6,735,535 B1 | 5/2004 | Kagan et al. |
| 6,751,563 B2 | 6/2004 | Spanier et al. |
| 6,836,737 B2 | 12/2004 | Petite et al. |
| 6,842,707 B2 | 1/2005 | Raichle et al. |
| 6,900,738 B2 | 5/2005 | Crichlow |
| 6,904,385 B1 | 6/2005 | Budike |
| 6,957,158 B1 | 10/2005 | Hancock et al. |
| 6,972,364 B2 | 12/2005 | Diedrichsen |
| 6,985,087 B2 | 1/2006 | Soliman |
| 7,006,934 B2 | 2/2006 | Jonker et al. |
| 7,010,438 B2 | 3/2006 | Hancock et al. |
| 7,043,459 B2 | 5/2006 | Peevey |
| 7,049,975 B2 | 5/2006 | Vanderah et al. |
| 7,050,808 B2 | 5/2006 | Janusz et al. |
| 7,072,779 B2 | 7/2006 | Hancock et al. |
| 7,085,824 B2 | 8/2006 | Forth et al. |
| 7,085,938 B1 | 8/2006 | Pozzuoli et al. |
| 7,126,493 B2 | 10/2006 | Junker et al. |
| 7,129,848 B2 | 10/2006 | Milliot et al. |
| 7,203,319 B2 | 4/2007 | Ben-Zur et al. |
| 7,243,050 B2 | 7/2007 | Armstrong |
| 7,249,265 B2 | 7/2007 | Carolsfeld et al. |
| 7,271,996 B2 | 9/2007 | Kagan et al. |
| 7,299,308 B2 | 11/2007 | Kondo et al. |
| 7,304,586 B2 | 12/2007 | Wang et al. |
| 7,337,081 B1 | 2/2008 | Kagan |
| 7,342,507 B2 | 3/2008 | Jonker et al. |
| 7,436,687 B2 | 10/2008 | Patel |
| 7,444,454 B2 | 10/2008 | Yancey et al. |
| 7,511,468 B2 | 3/2009 | McEachern et al. |
| 7,514,907 B2 | 4/2009 | Rajda et al. |
| 7,616,656 B2 | 11/2009 | Wang et al. |
| 7,668,663 B2 | 2/2010 | Kurnik et al. |
| 7,702,779 B2 | 4/2010 | Gupta et al. |
| 7,739,728 B1 | 6/2010 | Koehler et al. |
| 7,813,822 B1 | 10/2010 | Hoffberg |
| 7,899,630 B2 | 3/2011 | Kagan |
| 7,916,015 B1 | 3/2011 | Evancich et al. |
| 7,916,060 B2 | 3/2011 | Zhu et al. |
| 7,921,199 B1 | 4/2011 | Shirriff et al. |
| 7,961,736 B2 | 6/2011 | Ayyagari |
| 7,962,298 B2 | 6/2011 | Przydatek et al. |
| 7,999,696 B2 | 8/2011 | Wang et al. |
| 8,019,836 B2 | 9/2011 | Elliott et al. |
| 8,024,073 B2 | 9/2011 | Imes et al. |
| 8,037,173 B2 | 10/2011 | Tuckey et al. |
| 8,078,418 B2 | 12/2011 | Banhegyesi et al. |
| 8,160,824 B2 | 4/2012 | Spanier et al. |
| 8,190,381 B2 | 5/2012 | Spanier et al. |
| 8,193,929 B1 | 6/2012 | Siu et al. |
| 8,250,246 B2 | 8/2012 | Brockmann et al. |
| 8,335,936 B2 | 12/2012 | Jonsson et al. |
| 8,402,267 B1 | 3/2013 | Graham et al. |
| 8,599,036 B2 | 12/2013 | Wang et al. |
| 8,635,036 B2 | 1/2014 | Pamulaparthy et al. |
| 8,700,347 B2 | 4/2014 | Spanier et al. |

(56) References Cited

U.S. PATENT DOCUMENTS

| | | |
|---|---|---|
| 8,717,007 B2 | 5/2014 | Banhegyesi |
| 8,812,979 B2 | 8/2014 | Khanke et al. |
| 8,933,815 B2 | 1/2015 | Kagan et al. |
| 8,949,990 B1 | 2/2015 | Hsieh et al. |
| 9,080,894 B2 | 7/2015 | Spanier et al. |
| 9,094,227 B2 | 7/2015 | Park |
| 9,161,102 B2 | 10/2015 | Millstein et al. |
| 9,268,552 B1 | 2/2016 | Kiiskila et al. |
| 9,310,792 B2 | 4/2016 | Lu et al. |
| 9,660,994 B2 * | 5/2017 | McQuillan .......... H04L 63/1425 |
| 10,303,860 B2 | 5/2019 | Koval et al. |
| 10,510,000 B1 | 12/2019 | Commons |
| 10,678,964 B2 | 6/2020 | Kawai |
| 10,972,556 B1 | 4/2021 | Cheng et al. |
| 11,276,395 B1 | 3/2022 | Jones et al. |
| 2002/0024453 A1 | 2/2002 | Maeda |
| 2002/0032535 A1 | 3/2002 | Alexander et al. |
| 2002/0048269 A1 | 4/2002 | Hong et al. |
| 2002/0052972 A1 | 5/2002 | Yim |
| 2002/0065872 A1 | 5/2002 | Genske et al. |
| 2002/0073211 A1 | 6/2002 | Lin et al. |
| 2002/0095406 A1 | 7/2002 | George |
| 2002/0105435 A1 | 8/2002 | Yee et al. |
| 2002/0120723 A1 | 8/2002 | Forth et al. |
| 2002/0129342 A1 | 9/2002 | Kil et al. |
| 2002/0133504 A1 | 9/2002 | Vlahos et al. |
| 2002/0162014 A1 | 10/2002 | Przydatek et al. |
| 2002/0169570 A1 | 11/2002 | Spanier et al. |
| 2002/0174223 A1 | 11/2002 | Childers et al. |
| 2002/0188706 A1 | 12/2002 | Richards et al. |
| 2003/0005130 A1 | 1/2003 | Cheng |
| 2003/0014200 A1 | 1/2003 | Jonker et al. |
| 2003/0065757 A1 | 4/2003 | Mentze et al. |
| 2003/0084280 A1 | 5/2003 | Bryan et al. |
| 2003/0093429 A1 | 5/2003 | Nishikawa et al. |
| 2003/0110380 A1 | 6/2003 | Carolsfeld et al. |
| 2003/0163508 A1 | 8/2003 | Goodman |
| 2003/0178982 A1 | 9/2003 | Elms |
| 2003/0179714 A1 | 9/2003 | Gilgenbach et al. |
| 2003/0187550 A1 | 10/2003 | Wilson et al. |
| 2003/0200285 A1 | 10/2003 | Hansen et al. |
| 2003/0204756 A1 | 10/2003 | Ransom et al. |
| 2003/0226058 A1 | 12/2003 | Miller et al. |
| 2004/0078474 A1 | 4/2004 | Ramaswamy |
| 2004/0088408 A1 | 5/2004 | Tsyganskiy |
| 2004/0098459 A1 | 5/2004 | Leukert-Knapp et al. |
| 2004/0107025 A1 | 6/2004 | Ransom et al. |
| 2004/0122833 A1 | 6/2004 | Forth et al. |
| 2004/0127775 A1 | 7/2004 | Miyazaki et al. |
| 2004/0128260 A1 | 7/2004 | Amedure et al. |
| 2004/0138834 A1 | 7/2004 | Blackett et al. |
| 2004/0162642 A1 | 8/2004 | Gasper et al. |
| 2004/0170181 A1 | 9/2004 | Bogdon et al. |
| 2004/0172207 A1 | 9/2004 | Hancock et al. |
| 2004/0177062 A1 | 9/2004 | Urquhart et al. |
| 2004/0187028 A1 | 9/2004 | Perkins et al. |
| 2004/0193329 A1 | 9/2004 | Ransom et al. |
| 2004/0208182 A1 | 10/2004 | Boles et al. |
| 2004/0243735 A1 | 12/2004 | Rosenbloom et al. |
| 2004/0250059 A1 | 12/2004 | Ramelson et al. |
| 2005/0027464 A1 | 2/2005 | Jonker et al. |
| 2005/0033956 A1 | 2/2005 | Krempl |
| 2005/0060110 A1 | 3/2005 | Jones et al. |
| 2005/0093571 A1 | 5/2005 | Suaris et al. |
| 2005/0138421 A1 | 6/2005 | Fedronic et al. |
| 2005/0138432 A1 | 6/2005 | Ransom et al. |
| 2005/0144437 A1 | 6/2005 | Ransom et al. |
| 2005/0169309 A1 | 8/2005 | Tripathi et al. |
| 2005/0183128 A1 | 8/2005 | Assayag et al. |
| 2005/0187725 A1 | 8/2005 | Cox |
| 2005/0202808 A1 | 9/2005 | Fishman et al. |
| 2005/0234837 A1 | 10/2005 | Ramachandran et al. |
| 2005/0240540 A1 | 10/2005 | Borleske et al. |
| 2005/0253682 A1 | 11/2005 | Kato et al. |
| 2005/0273280 A1 | 12/2005 | Cox |
| 2005/0273281 A1 | 12/2005 | Wall et al. |
| 2006/0020788 A1 | 1/2006 | Han et al. |
| 2006/0047787 A1 | 3/2006 | Agarwal et al. |
| 2006/0052958 A1 | 3/2006 | Hancock et al. |
| 2006/0066456 A1 | 3/2006 | Jonker et al. |
| 2006/0066903 A1 | 3/2006 | Shiimori |
| 2006/0083260 A1 | 4/2006 | Wang et al. |
| 2006/0085419 A1 | 4/2006 | Rosen |
| 2006/0089932 A1 | 4/2006 | Buehler et al. |
| 2006/0145890 A1 | 7/2006 | Junker et al. |
| 2006/0155422 A1 | 7/2006 | Uy et al. |
| 2006/0155442 A1 | 7/2006 | Luo et al. |
| 2006/0161360 A1 | 7/2006 | Yao et al. |
| 2006/0161400 A1 | 7/2006 | Kagan |
| 2006/0200599 A1 | 9/2006 | Manchester et al. |
| 2006/0206433 A1 | 9/2006 | Scoggins |
| 2006/0265720 A1 | 11/2006 | Cai et al. |
| 2006/0267560 A1 | 11/2006 | Rajda et al. |
| 2006/0274899 A1 | 12/2006 | Zhu et al. |
| 2007/0047735 A1 | 3/2007 | Celli et al. |
| 2007/0058634 A1 | 3/2007 | Gupta et al. |
| 2007/0061786 A1 | 3/2007 | Zhou et al. |
| 2007/0067119 A1 | 3/2007 | Loewen et al. |
| 2007/0067121 A1 | 3/2007 | Przydatek et al. |
| 2007/0096765 A1 | 5/2007 | Kagan |
| 2007/0096942 A1 | 5/2007 | Kagan et al. |
| 2007/0106618 A1 | 5/2007 | Wu et al. |
| 2007/0114987 A1 | 5/2007 | Kagan |
| 2007/0120705 A1 | 5/2007 | Kiiskila et al. |
| 2007/0136236 A1 | 6/2007 | Kussmaul et al. |
| 2007/0152058 A1 | 7/2007 | Yeakley et al. |
| 2007/0186111 A1 | 8/2007 | Durand |
| 2007/0240159 A1 | 10/2007 | Sugiyama |
| 2007/0255861 A1 | 11/2007 | Kain et al. |
| 2007/0263643 A1 | 11/2007 | Wadhawan |
| 2007/0266004 A1 | 11/2007 | Wall et al. |
| 2008/0028395 A1 | 1/2008 | Motta et al. |
| 2008/0033786 A1 | 2/2008 | Boaz et al. |
| 2008/0033920 A1 | 2/2008 | Colclasure et al. |
| 2008/0046205 A1 | 2/2008 | Gilbert et al. |
| 2008/0052384 A1 | 2/2008 | Marl et al. |
| 2008/0071482 A1 | 3/2008 | Zweigle et al. |
| 2008/0074285 A1 | 3/2008 | Guthrie |
| 2008/0077806 A1 | 3/2008 | Cui et al. |
| 2008/0086222 A1 | 4/2008 | Kagan |
| 2008/0103631 A1 | 5/2008 | Koliwad et al. |
| 2008/0104149 A1 | 5/2008 | Vishniac et al. |
| 2008/0130639 A1 | 6/2008 | Costa-Requena et al. |
| 2008/0147334 A1 | 6/2008 | Kagan |
| 2008/0168434 A1 | 7/2008 | Gee et al. |
| 2008/0172192 A1 | 7/2008 | Banhegyesi |
| 2008/0187116 A1 | 8/2008 | Reeves et al. |
| 2008/0195562 A1 | 8/2008 | Worth et al. |
| 2008/0195794 A1 | 8/2008 | Banker |
| 2008/0201723 A1 | 8/2008 | Bottaro et al. |
| 2008/0215264 A1 | 9/2008 | Spanier et al. |
| 2008/0228830 A1 | 9/2008 | Hawtin |
| 2008/0234957 A1 | 9/2008 | Banhegyesi et al. |
| 2008/0235355 A1 | 9/2008 | Spanier et al. |
| 2008/0238406 A1 | 10/2008 | Banhegyesi |
| 2008/0238713 A1 | 10/2008 | Banhegyesi et al. |
| 2008/0243404 A1 | 10/2008 | Banhegyesi |
| 2008/0291054 A1 | 11/2008 | Groft |
| 2009/0012728 A1 | 1/2009 | Spanier et al. |
| 2009/0037163 A1 | 2/2009 | Kong et al. |
| 2009/0055912 A1 | 2/2009 | Choi et al. |
| 2009/0070168 A1 | 3/2009 | Thompson et al. |
| 2009/0070447 A1 | 3/2009 | Jubinville et al. |
| 2009/0082879 A1 | 3/2009 | Dooley et al. |
| 2009/0082980 A1 | 3/2009 | Thurmond et al. |
| 2009/0094317 A1 | 4/2009 | Venkitaraman |
| 2009/0096654 A1 | 4/2009 | Zhu et al. |
| 2009/0115626 A1 | 5/2009 | Vaswani et al. |
| 2009/0119476 A1 | 5/2009 | Jernigan et al. |
| 2009/0172519 A1 | 7/2009 | Xu et al. |
| 2009/0190486 A1 | 7/2009 | LaVigne et al. |
| 2009/0196187 A1 | 8/2009 | Ooba et al. |
| 2009/0196206 A1 | 8/2009 | Weaver et al. |
| 2009/0228224 A1 | 9/2009 | Spanier et al. |

(56) References Cited

U.S. PATENT DOCUMENTS

| | | |
|---|---|---|
| 2009/0235075 A1 | 9/2009 | Cho et al. |
| 2009/0235090 A1 | 9/2009 | Chang |
| 2009/0276102 A1 | 11/2009 | Smith et al. |
| 2009/0292894 A1 | 11/2009 | Henry et al. |
| 2009/0300165 A1 | 12/2009 | Tuckey et al. |
| 2009/0307178 A1 | 12/2009 | Kuhns et al. |
| 2009/0327483 A1 | 12/2009 | Thompson et al. |
| 2010/0004350 A1 | 1/2010 | Zalich et al. |
| 2010/0007354 A1 | 1/2010 | Deaver et al. |
| 2010/0030734 A1 | 2/2010 | Chunilal |
| 2010/0031076 A1 | 2/2010 | Wan et al. |
| 2010/0054276 A1 | 3/2010 | Wang et al. |
| 2010/0057387 A1 | 3/2010 | Kagan et al. |
| 2010/0057628 A1 | 3/2010 | Trinidad et al. |
| 2010/0058355 A1 | 3/2010 | Gernaey |
| 2010/0073192 A1 | 3/2010 | Goldfisher et al. |
| 2010/0094851 A1 | 4/2010 | Bent et al. |
| 2010/0121996 A1 | 5/2010 | Schmidt et al. |
| 2010/0169709 A1 | 7/2010 | Chiu et al. |
| 2010/0169876 A1 | 7/2010 | Mann |
| 2010/0175062 A1 | 7/2010 | Kim |
| 2010/0211682 A1 | 8/2010 | Capomassi et al. |
| 2010/0217871 A1 | 8/2010 | Gammon |
| 2010/0238003 A1 | 9/2010 | Chan et al. |
| 2010/0278187 A1 | 11/2010 | Hart et al. |
| 2010/0299441 A1 | 11/2010 | Hughes et al. |
| 2010/0324845 A1 | 12/2010 | Spanier et al. |
| 2011/0004350 A1 | 1/2011 | Cheifetz et al. |
| 2011/0004426 A1 | 1/2011 | Wright et al. |
| 2011/0015961 A1 | 1/2011 | Chan |
| 2011/0016021 A1 | 1/2011 | Manning |
| 2011/0029461 A1 | 2/2011 | Hardin, Jr. |
| 2011/0040809 A1 | 2/2011 | Spanier et al. |
| 2011/0069709 A1 | 3/2011 | Morris et al. |
| 2011/0072423 A1 | 3/2011 | Fukata |
| 2011/0078305 A1 | 3/2011 | Varela |
| 2011/0093843 A1 | 4/2011 | Endo et al. |
| 2011/0106589 A1 | 5/2011 | Blomberg et al. |
| 2011/0107357 A1 | 5/2011 | Cullimore |
| 2011/0157837 A1 | 6/2011 | Balgard et al. |
| 2011/0178651 A1 | 7/2011 | Choi et al. |
| 2011/0184671 A1 | 7/2011 | Abiprojo et al. |
| 2011/0282508 A1 | 11/2011 | Goutard et al. |
| 2011/0296496 A1 | 12/2011 | O'Donnell et al. |
| 2012/0041696 A1 | 2/2012 | Sanderford et al. |
| 2012/0059932 A1 | 3/2012 | Messer et al. |
| 2012/0078547 A1 | 3/2012 | Murdoch |
| 2012/0079471 A1 | 3/2012 | Vidal et al. |
| 2012/0099478 A1 | 4/2012 | Fu et al. |
| 2012/0109999 A1 | 5/2012 | Futty et al. |
| 2012/0126995 A1 | 5/2012 | Sobotka et al. |
| 2012/0173032 A1 | 7/2012 | Pamulaparthy et al. |
| 2012/0179648 A1 | 7/2012 | Loo |
| 2012/0209057 A1 | 8/2012 | Siess et al. |
| 2012/0216244 A1 | 8/2012 | Kumar et al. |
| 2012/0245595 A1 | 9/2012 | Kesavadas et al. |
| 2012/0265357 A1 | 10/2012 | Song et al. |
| 2012/0296746 A1 | 11/2012 | Bleadall et al. |
| 2012/0299744 A1 | 11/2012 | Sfaelos |
| 2013/0031201 A1 | 1/2013 | Kagan et al. |
| 2013/0055389 A1 | 2/2013 | Alvarez et al. |
| 2013/0066965 A1 | 3/2013 | Foti |
| 2013/0073059 A1 | 3/2013 | Brian et al. |
| 2013/0073374 A1 | 3/2013 | Heath |
| 2013/0084882 A1 | 4/2013 | Khorashadi et al. |
| 2013/0103657 A1 | 4/2013 | Ikawa et al. |
| 2013/0151849 A1 | 6/2013 | Graham et al. |
| 2013/0158918 A1 | 6/2013 | Spanier et al. |
| 2013/0198507 A1 | 8/2013 | Kasuya |
| 2013/0200702 A1 | 8/2013 | Schöppner |
| 2013/0204450 A1 | 8/2013 | Kagan et al. |
| 2013/0293390 A1 | 11/2013 | Buhan et al. |
| 2013/0318627 A1 | 11/2013 | Lundkvist et al. |
| 2014/0025321 A1 | 1/2014 | Spanier |
| 2014/0058572 A1 | 2/2014 | Stein et al. |
| 2014/0094194 A1 | 4/2014 | Schwent et al. |
| 2014/0149836 A1 | 5/2014 | Bedard et al. |
| 2014/0172885 A1 | 6/2014 | Sekharan |
| 2014/0236371 A1 | 8/2014 | Ishihara et al. |
| 2014/0277788 A1 | 9/2014 | Forbes, Jr. |
| 2014/0281620 A1 | 9/2014 | Rallo et al. |
| 2014/0325679 A1 | 10/2014 | Heo et al. |
| 2015/0039279 A1 | 2/2015 | Volovoi |
| 2015/0089061 A1 | 3/2015 | Li et al. |
| 2015/0143108 A1 | 5/2015 | Demeter et al. |
| 2015/0178865 A1 | 6/2015 | Anderson et al. |
| 2015/0185748 A1 | 7/2015 | Ishchenko et al. |
| 2015/0286394 A1 | 10/2015 | Koval |
| 2015/0294013 A1 | 10/2015 | Ozer |
| 2015/0316907 A1 | 11/2015 | ElBsat et al. |
| 2015/0317151 A1 | 11/2015 | Falcy et al. |
| 2015/0317589 A1 | 11/2015 | Anderson et al. |
| 2015/0324896 A1 | 11/2015 | Marson et al. |
| 2015/0341969 A1 | 11/2015 | Brochu et al. |
| 2016/0011616 A1 | 1/2016 | Janous et al. |
| 2016/0034437 A1 | 2/2016 | Yong et al. |
| 2016/0156184 A1 | 6/2016 | Sharma et al. |
| 2016/0283256 A1 | 9/2016 | Standley et al. |
| 2016/0294953 A1 | 10/2016 | Prabhakar et al. |
| 2016/0359684 A1 | 12/2016 | Rizqi et al. |
| 2016/0364648 A1 | 12/2016 | Du et al. |
| 2017/0011320 A1 | 1/2017 | Anderson et al. |
| 2017/0039372 A1 | 2/2017 | Koval et al. |
| 2017/0063566 A1* | 3/2017 | Seminario ............... H04L 67/12 |
| 2017/0078455 A1 | 3/2017 | Fisher et al. |
| 2017/0140149 A1 | 5/2017 | Dumas et al. |
| 2017/0147329 A1 | 5/2017 | Shutt et al. |
| 2017/0162320 A1 | 6/2017 | Rumrill |
| 2017/0180137 A1 | 6/2017 | Spanier et al. |
| 2017/0185056 A1 | 6/2017 | Satou |
| 2017/0238805 A1 | 8/2017 | Addison et al. |
| 2017/0270414 A1 | 9/2017 | Ignatova et al. |
| 2017/0285114 A1 | 10/2017 | Bickel et al. |
| 2017/0317495 A1 | 11/2017 | Pavlovski et al. |
| 2017/0323208 A1 | 11/2017 | Al-Mohssen et al. |
| 2017/0373500 A1 | 12/2017 | Shafi et al. |
| 2018/0025423 A1 | 1/2018 | Utsumi et al. |
| 2018/0066860 A1 | 3/2018 | Carlson et al. |
| 2018/0260695 A1 | 9/2018 | Majumdar et al. |
| 2018/0260920 A1 | 9/2018 | Saratsis et al. |
| 2018/0275898 A1 | 9/2018 | Bhansali et al. |
| 2019/0086891 A1 | 3/2019 | Kawamoto et al. |
| 2019/0102411 A1 | 4/2019 | Hung et al. |
| 2019/0138964 A1 | 5/2019 | Morita et al. |
| 2019/0205116 A1 | 7/2019 | Chen et al. |
| 2019/0260204 A1 | 8/2019 | Koval et al. |
| 2019/0340545 A1 | 11/2019 | Minegishi et al. |
| 2019/0349733 A1 | 11/2019 | Nolan et al. |
| 2020/0143522 A1 | 5/2020 | Vogels et al. |
| 2020/0266628 A1 | 8/2020 | Kato et al. |
| 2020/0273268 A1 | 8/2020 | Bhattacharyya et al. |
| 2020/0333767 A1 | 10/2020 | Engelstein et al. |
| 2022/0279220 A1 | 9/2022 | Khavronin et al. |

FOREIGN PATENT DOCUMENTS

| | | |
|---|---|---|
| JP | 2001312712 A | 11/2001 |
| JP | 2009225629 A | 10/2009 |
| KR | 101522175 B1 | 5/2015 |
| WO | 2008099035 A1 | 8/2008 |
| WO | 2009044369 A2 | 4/2009 |
| WO | 2009044369 A3 | 5/2009 |

OTHER PUBLICATIONS

Wiratama et al., 2018 IEEE, 2018 International Electronics Symposium on Knowledge Creation and Intelligent Computing (IES-KCIC), "Gas Billing System based on Automatic Meter Reading on Diaphragm Gas Meter with Email Notification", pp. 395-402 (Year: 2018).*

(56) References Cited

OTHER PUBLICATIONS

ION Technology, 7500 ION 7600 ION High Visibility Energy & Power Quality Compliance Meters, Power Measurement, specification, pp. 1-8, revision date Nov. 30, 2000.
Microsoft TechNet, Using DNS Servers with DHCP, Jan. 21, 2005; Accessed from https://technet.microsoft.com/en-us/library/cc787034 on Jun. 9, 2015; pp. 1-4.
"Use Excel as a Web Browser" at https://www.youtube.com/watch?v=A7LukCXev78 (Year: 2010).
Allard, Jeremie, et al., "Jini meets UPnP: an architecture for Jini/UPnP interoperability.", Proceedings of the 2003 Symposium on Applications and the Internet, 2003. IEEE, 2003, 8 pages.
Braden, R (editor), "Requirements for Internet Hosts—Application and Support", RFC 1123, pp. 1-97, Oct. 1989.
Chima, Chikodi, "How Social Media Will Make the smart Energy Grid More Efficient", mashable.com, Feb. 8, 2011, pp. 1-4.
Codingfreak, "https://web.archive.org/web/201 00426123449/http://codingfreak.blogspot.com/201 0/01 /iptables-rate-limitincoming.htm", Apr. 26, 2010.
Communicator EXT 3.0 User Manual Revision 1.32, Electro Industries/Gauge Tech, 558 pages, Aug. 27, 2007.
Crockford, Douglas, "https://web.archive.org/web/20030621 080211 /http://www.crockford.com/javascript/jsmin.html", Oct. 28, 2002.
Deutsch, P., Emtage, A., and Marine, A., "How to Use Anonymous FTP", RFC1635, pp. 1-13, May 1994.
Duncan, Brent K. et al., "Protection, metering, monitoring, and control of medium-voltage power systems.", IEEE Transactions on Industry Applications, vol. 40, No. 1, Jan./Feb. 2004; pp. 33-40.
Futura+Series, "Advanced Power Monitoring and Analysis for the 21st Century", Electro Industries/Gauge Tech, specification, 8 pages, Apr. 13, 2000.
Gonzales, Jesus and Papa, Mauricio, "Passive Scanning in Modbus Networks;" 2008, in IFIP International Federation for Information Processing, vol. 253, Critical Infrastructure Protection; 2008; pp. 175-187.
Hubbert, "What is flat file?", WhatIs.com, http://searchsqlserver.techtarget.com/definition/flat-file, Jul. 2006, 1 pp.
HW Virtual Serial Port, "HW Virtual Serial Port" Jul. 2003, http://www.trcontrolsolutions.com/pdfs/hw_vsp_v104_en.pdf; pp. 1-4.
IEC 61000-4-15: Electromagnetic compatibility (EMC) Part 4: Testing and measuring techniques, Section 15: Flickermeter—Functional and design specifications; CENELEC—European Committee for Electrotechnical Standardization; pp. 1-25; Apr. 1998.
ION Technology 7700 ION 3-Phase Power Meter, Analyzer and Controller, Power Measurement, specification, pp. 1-10, revision date Dec. 8, 1998.
ION Technology, 7500 ION High Visibility 3-Phase Energy & Power Quality Meter, Power Measurement, specification, pp. 1-8, revision date Mar. 21, 2000.
ION7550/ion7650 PowerLogic power-monitoring units, Technical data sheets, pp. 1-12, Copyright 2006 Schneider Electric.
Natarajan "4 Easy Steps to Upgrade Linksys Wireless Router" thegeekstuff.com, 2009, 3 pages. retreived from https://www.thegeekstuff.com/2009/06/how-to-upgrade-linksys-wireless-router-firmware on Jun. 7, 2019 (Year: 2009).
Nexus 1250 Installation and Operation Manual Revision 1.20, Electro Industries/Gauge Tech, 50 pages, Nov. 8, 2000.
Nexus 1250, Precision Power Meter & Data Acquisition Node, Accumeasure Technology, Electro Industries/Gauge Tech, specification, 16 pages, Nov. 1999.
Paladion, https://www.paladion.net/blogs/introduction-to-code-obfuscation, 2004 (Year: 2004).
Performance Power Meter & Data Acquisition Node, Electro Industries/Gauge Tech, Nexus 1250 specification, 8 pages, Dec. 14, 2000.
Postel, J.B., and Reynolds, J.K. "File Transfer Protocol (FTP)", RFC959, pp. 1-66, Oct. 1985.
PowerLogic Series 4000 Circuit Monitors, pp. 1-4; Document #3020HO0601; Jan. 2006.
RFC2228 FTP Security Extensions; Network Working Group, Internet Society, 1997; Retrieved from https://tools.ietf.org/html/rfc2228 Apr. 18, 2019; (Year: 1997); pp. 1-28.
Speirs, "What is binary file?", WhatIs.com, http://whatis.techtarget.com/definition/binary-file, Apr. 2005, 1 pp.
UPnP Forum, "UPnP Device Architecture 1.0", Rev. Apr. 24, 2008, pp. 1-80.
User's Installation & Operation and User's Programming Manual. The Futura Series, Electro Industries, pp. 1-64, Copyright 1995.
White, Russ, "Working with IP addresses"; http://web.archive.org/web/20060508172602/http://www.cisco.com/web/about/ac123/ac147/archived_issues/ipj_9-1/ip_addresses.tml, May 8, 2006; Copyright 1992-2006 Cisco Systems, Inc., pp. 1-8.
Wikipedia, Burst mode (computing), https://web.archive.org/web/20081018044345/http://en.wikipedia.org/wiki/Burst_mode_(computing), Oct. 18, 2008, 1 pp.
Wikipedia, File Transfer Protocol, https://web.archive.org/web/20051216071210/http:en.wikipedia.org/wiki/File_Transfer_Protocol, Dec. 16, 2005, 9 pp.
Wikipedia, Universal Plug and Play, https://web.archive.org/web/2001014015536/http://en.wikipedia.org/wiki/Universal_Plug_and_Play, Oct. 14, 2007, 14 pp.
Wils, Andrew, et al., "Device discovery via residential gateways.", IEEE Transactions on Consumer Electronics, vol. 48, No. 3; Aug. 2002; pp. 478-483.
Yum, Secured Remote Data, Manual Page. 2012; Retrieved from yum.baseurl.org/wiki/securedRemoteData on Apr. 18, 2019. (Dated Reference from Archive.org attached) (Year: 2012) pp. 1-2.
Zeinalipour-Yazti et ai, MicroHash: An Efficient Index Structure for Flash-Based Sensor Devices, Proceedings of the 4th Conference on USENIX Conference on File and Storage Technologies, vol. 4, Dec. 2005, pp. 14.
Zhang, Chun, et al., "On supporting containment queries in relational database management systems.", ACM SIGMOD Record. vol. 30. No. 2. ACM, 2001; pp. 425-436.
Microsoft, Computer Dictionary, 2002, 5th Ed. (Year: 2002) Definition of Javascript.
"The Debian New Maintainer's Guide", Debian.org, 2011, Chapters 1, 6, and B. retrieved from https:/lweb.archive.org/web/2011 051401193B/http://www.debian.org/doc/manuals/maint-guide/start.en.html (Apr. 2B, 2021). (Year: 2011).
Andersen, M.P. and Culler, D.E., 2016. Btrdb: Optimizing storage system design for timeseries processing. In 14th {USENIX} Conference on File and Storage Technologies ({FAST} 16) (pp. 39-52). (Year: 2016).
Dong Yu, Wayne Xiong, Jasha Droppo, Andreas Stolcke, Guoli Ye, Jinyu Li, Geoffrey Zweig, 2016. Proc. Interspeech: Deep Convolutional Neural Networks with Layer-wise Context Expansion and Attention, 5 pages, Sep. 2016.
Janetzko, H., Stoffel, F., Mittelstadt, S. and Keim, DA, 2014. Anomaly detection for visual analytics of power consumption data.Computers & Graphics, 38, pp. 27-37. (Year: 2014).
Kezunovic, M., 2011. Smart fault location for smart grids. IEEE transactions on smart grid, 2(1), pp. 11-22. (Year: 2011).
Microsoft, Microsoft Computer Dictionary, 5th Ed. 2002; pp. 174, 215, and 276 (excerpt includes table of contents and frontmatter). (Year: 2002).
Milanovic, J.V., Aung, M.T. and Gupta, C.P., 2005. The influence of fault distribution on stochastic prediction of voltage sags. IEEE Transactions on Power Delivery, 20(1), pp. 278-285. (Year:2005).
Pan, J., Zi, Y., Chen, J., Zhou, Z. and Wang, B., 2017. LiftingNet: A novel deep learning network with layerwise feature learningfrom noisy mechanical data for fault classification. I EEE Transactions on Industrial Electronics, 65(6), pp. 4973-4982. (Year: 2017).
The Study Genius, "What is N IC (Network Interface Card)? How NIC works?", https://web.archive.org/web/20201117135313/https://www.thestudygenius.com/what-is-nic-network-interface-card/, 9 pp., Nov. 17, 2020 (Year: 2020).
Trunov, A.S., Voronova, L.I., Voronov, V.I., Sukhachev, D.I. and Strelnikov, V.G., Mar. 2018. Legacy applications modelintegration to support scientific experiment. In 2018 Systems of Signals Generating and Processing in the Field of on BoardCommunications (pp. 1-7). IEEE. (Year: 2018).

(56) References Cited

OTHER PUBLICATIONS

Tufekci, P., 2014. Prediction of full load electrical power output of a base load operated combined cycle power plant using machinelearning methods. International Journal of Electrical Power & Energy Systems, 60, pp. 126-140. (Year: 2014).

WhatIs.com, "What is a Network Interface Card?", hUps://www.techtarget.com/searchnetworking/definition/network-interface-card?_gl=1*l3qjdky*_ga*NzA 1 MzE3NjAyLjE2MzI3NzU5NjA.*_ga_TQKE4GS5P9*MTYzMjk1 MDkzNC4yLjEuMTYzMjk1MTY3Ny4w&_ga=2.164813883.525309060.1632950935-705317602.1632775960, Sep. 27, 2021; 5 pp. (Year: 2021).

Wikipedia, User Datagram Protocol, https://web.archive.org/web/20050823032448/https://en. wikipedia .org/wiki/User_Datagram_Protocol, Aug. 23, 2005, 2 pp. (Year: 2005).

Wikipedia, Dojo Toolkit, hUps://web.archive.org/web/20130201004903/hUps://en.wikipedia.org/wiki/Dojo_ Toolkit, Feb. 1, 2013, 10 pp.(Year: 2013).

Khan et al., "Approach for smart meter load profiling in Monte Carlo simulation applications," IET Generation, Transmission & Distribution, 2017, vol. 11, No. 7, pp. 1856-1864.

\* cited by examiner

ENTERPRISE SECURITY IN METERS

PRIORITY

This application claims priority to U.S. Provisional Patent Application Serial No. 62/858,586, filed Jun. 7, 2019, the contents of which are hereby incorporated by reference in its entirety.

BACKGROUND

Field

The present disclosure relates generally to intelligent electronic devices (IEDs) and, in particular, to devices, systems and methods for providing security in intelligent electronic devices, for example, meters, protective relays, programmable logic controllers (PLCs) and the like.

Description of the Related Art

Monitoring of electrical energy by consumers and providers of electric power is a fundamental function within any electric power distribution system. Electrical energy may be monitored for purposes of usage, equipment performance and power quality. Electrical parameters that may be monitored include volts, amps, watts, vars, power factor, harmonics, kilowatt hours, kilovar hours and any other power related measurement parameters. Typically, measurement of the voltage and current at a location within the electric power distribution system may be used to determine the electrical parameters for electrical energy flowing through that location.

Devices that perform monitoring of electrical energy may be electromechanical devices, such as, for example, a residential billing meter or may be an intelligent electronic device ("IED"). Intelligent electronic devices typically include some form of a processor. In general, the processor is capable of using the measured voltage and current to derive the measurement parameters. The processor operates based on a software configuration. A typical consumer or supplier of electrical energy may have many intelligent electronic devices installed and operating throughout their operations. IEDs may be positioned along the supplier's distribution path or within a customer's internal distribution system. IEDs include revenue electric watt-hour meters, protection relays, programmable logic controllers, remote terminal units, fault recorders and other devices used to monitor and/or control electrical power distribution and consumption. IEDs are widely available that make use of memory and microprocessors to provide increased versatility and additional functionality. Such functionality includes the ability to communicate with remote computing systems, either via a direct connection, e.g., a modem, a wireless connection or a network. IEDs also include legacy mechanical or electromechanical devices that have been retrofitted with appropriate hardware and/or software allowing integration with the power management system.

Typically, an IED is associated with a particular load or set of loads that are drawing electrical power from the power distribution system. The IED may also be capable of receiving data from or controlling its associated load. Depending on the type of IED and the type of load it may be associated with, the IED implements a power management function that is able to respond to a power management command and/or generate power management data. Power management functions include measuring power consumption, controlling power distribution such as a relay function, monitoring power quality, measuring power parameters such as phasor components, voltage or current, controlling power generation facilities, computing revenue, controlling electrical power flow and load shedding, or combinations thereof.

Security in meters has been a traditionally overlooked feature in the power industry. Historically, this has been due to meters primarily being installed on serial networks, or only accessible by hand held readers. However, as networks become more connected, and devices more advanced, so too does the risk of a meter being compromised.

When security is implemented in meters, it is often a simple numeric password, and often providing complete access to the device. However, even when a more complex password is allowed, users will often still use simple passwords anyway; or even worse, they configure all meters on a network with the same password, which allows the compromise of one meter to allow the compromise of all meters.

SUMMARY

The present disclosure provides for enterprise security in intelligent electronic devices such as electric power meters. In accordance with the present disclosure, enterprise security is a security system in which each individual device, instead of configuring and storing security configurations locally, use a security server for security verifications. Such a security server of the present disclosure may be a dedicated computer on a network, that is used to manage the security configuration for all users. This makes it simpler for administrators to configure users and devices, which in turn improves security by encouraging security to be properly configured.

Additionally, since users and devices are all managed in one place, the risk of using a single password on all devices can be mitigated, by allowing users to use the same login across all meters. Users are then encouraged to use more complex passwords, since the users don't have to memorize hundreds or thousands of passwords; and if a user/password is compromised, all the devices can have their security configuration changed simultaneously, rather than tediously reconfiguring each one.

Enterprise security servers may be used to manage a range of existing devices, such as PC's, Routers, Switches, Servers, etc. One example of an enterprise security server would be a Windows Domain Controller; another would be a Remote Authentication Dial-in User Service (RADIUS) server, often used with Wi-Fi Protected Access (WPA)-Enterprise enabled Wi-Fi Routers. Such an enterprise security server may also allow meters to use a Federated Identity, where a single identity may be used by a user to log in to multiple services, such as a domain, a meter, and their PC.

In one aspect of the present disclosure, a system is provided including a network for coupling devices and enabling the transmission of data between the devices; at least one security server coupled to the network including a first memory, the first memory configured to store security configurations for a plurality of meters; and the plurality of meters, each meter of the plurality of meters including: a communication device for coupling the meter to the network and receiving the security configuration for the meter, and a second memory for storing the security configuration in a local database.

In one aspect, the first memory further includes a mapping of each meter to security credentials of individual users.

In another aspect, the communication device of each meter is configured to pull the security configuration from the security server without the security server knowing the network address of the meter.

In a further aspect, the security server sends a notification to each meter when a security configuration has changes and the meter pulls the changed security configuration after receiving the notification.

In another aspect, the notification is sent via at least one of a Modbus command and/or a HTTP POST command.

In one aspect, the notification is broadcast as a UDP (user datagram protocol) message to the plurality of meters.

In still another aspect, the security configuration for each meter includes a device profile for the meter, the device profile including security and non-security parameters.

In a further aspect, the device profile is configured via a Lightweight Directory Access Protocol (LDAP) setting profile of the meter.

In one aspect, the security configuration is a single list of user credentials applicable to each meter.

In another aspect, the list identifies which specific meter of the plurality of meters a specific user has access to.

In yet another aspect, the security configuration includes a plurality of users arranged in at least one group, access permissions to the plurality of meters being based on the at least one group.

In another aspect, the at least one groups is configured via Windows Active Directories and features of the meter are managed as Active Directory objects.

In a further aspect, the communication device transmits a security event to the security server for storage in a log.

In another aspect, the security event is transmitted via a Lightweight Directory Access Protocol (LDAP).

In one aspect, the log is fed into a security information and event management (SIEM) system for analysis, wherein the SIEM system generates an alert based on at least one of when a specified event is detected, a threshold of event occurrences has been exceeded and/or a combination of events has occurred.

In another aspect, the log is fed into an intrusion detection system (IDS) for analysis, wherein the IDS system generates an alert based events indicative of an intrusion by an attacker.

In another aspect of the present disclosure, an electric power meter includes at least one sensor coupled an electrical power distribution system, the at least one sensor configured to measure at least one parameter of the electrical power distribution system and generate at least one analog signal indicative of the at least one parameter; at least one analog-to-digital converter configured to receive the at least one analog signal and convert the at least one analog signal to at least one digital signal; at least one processor configured to receive the at least one digital signal and calculate at least one power parameter of the electrical power distribution system; and a communication device for coupling the meter to a network, querying a security server for user credentials upon a user attempting to log into the meter and retrieving the user credentials, wherein the at least one processor compares the retrieved user credentials to credentials used in the log in attempt to grant access to the meter.

In another aspect, the at least one processor caches the retrieved user credentials in a memory of the meter and requeries the security server upon the retrieved user credentials expiring.

In one aspect, the at least one processor limits the number of user credentials stored in the memory.

In another aspect, the at least one processor transmits a security event to the security server for storage in a log.

In a further aspect, the security event is transmitted via a Lightweight Directory Access Protocol (LDAP).

In a further aspect of the present disclosure, a method for authenticating a meter includes generating a first certificate for the meter; receiving the first certificate at the meter; generating a second certificate at the meter; generating a private key and a public key at the meter based on the second certificate; and transmitting the public key to a security server.

In one aspect, the method further includes generating a message to be transmitted to the security server; computing a hash value of the message; generating a signature using the private key; and transmitting a combined message to the security server, the combined message including the message, the hash and the signature, wherein the security server verifies the signature and hash to authenticate the message came from a valid meter.

BRIEF DESCRIPTION OF THE DRAWINGS

These and other objects, features and advantages of the present disclosure will be apparent from a consideration of the following Detailed Description considered in conjunction with the drawing Figures, in which.

DETAILED DESCRIPTION

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

Figure 1:
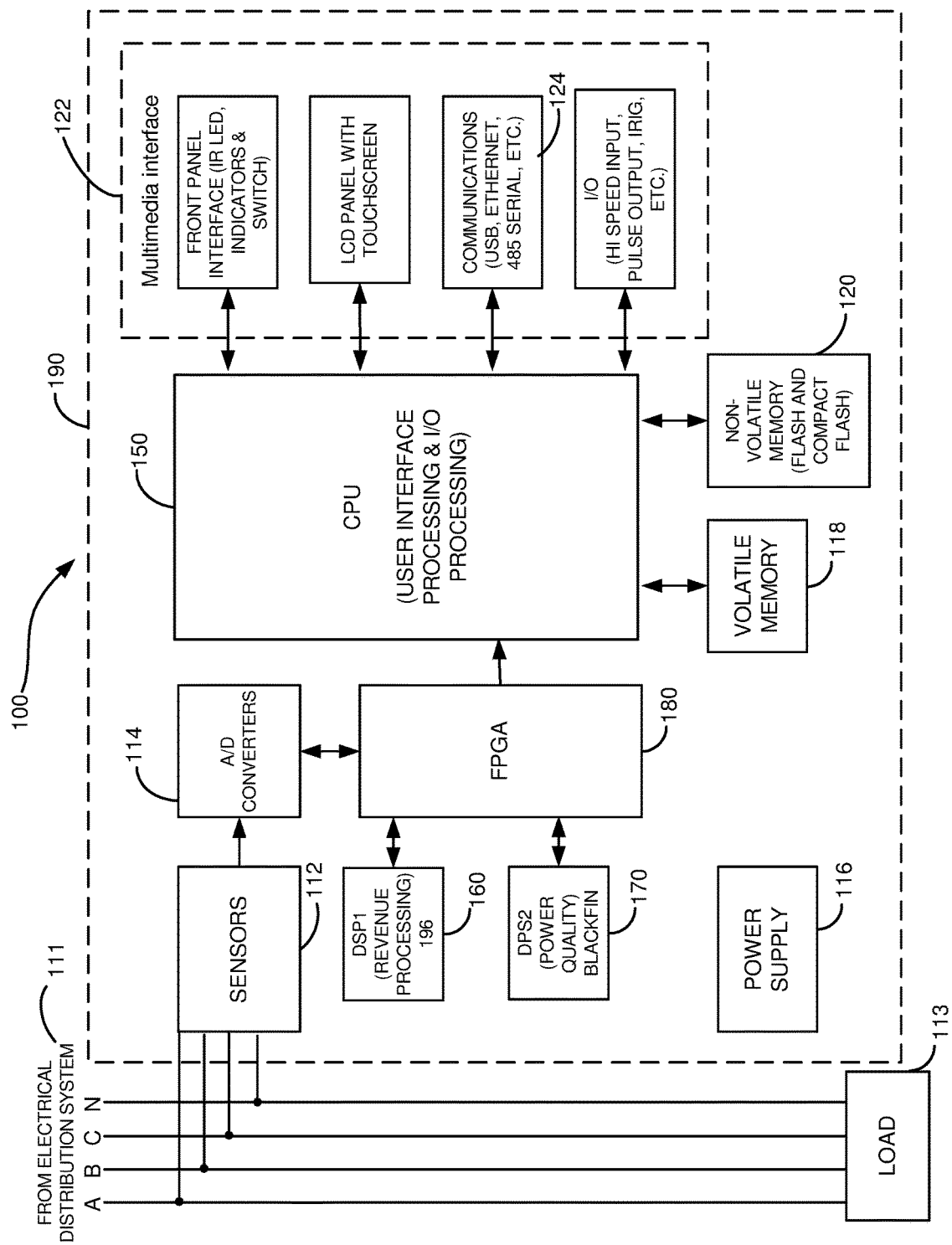
FIG. 1 is a block diagram of an intelligent electronic device (IED), according to an embodiment of the present disclosure.

FIG. 1 is a block diagram of an intelligent electronic device (IED) 100 for monitoring and determining power usage and power quality for any metered point within a power distribution system and for providing a data transfer system for faster and more accurate processing of revenue and waveform analysis.

The IED 100 of FIG. 1 includes a plurality of sensors 112 coupled to various phases A, B, C and neutral N of an electrical distribution system 111, a plurality of analog-to-digital (A/D) converters 114, including inputs coupled to the sensor 112 outputs, a power supply 116, a volatile memory 118, an non-volatile memory 120, a multimedia user interface 122, and a processing system that includes at least one central processing unit (CPU) 150 (or host processor) and/or one or more digital signal processors, two of which are shown, i.e., DSP1 160 and DSP2 170. The IED 100 also includes a Field Programmable Gate Array 180 which performs a number of functions, including, but not limited to, acting as a communications gateway for routing data between the various processors 150, 160, 170, receiving data from the A/D converters 114 performing transient detection and capture and performing memory decoding for CPU 150 and the DSP processor 160. In one embodiment, the FPGA 80 is internally comprised of two dual port memories to facilitate the various functions. It is to be appreciated that the various components shown in FIG. 1 are contained within housing 190. Exemplary housings will be described below in relation to FIGS. 2A-2H.

The plurality of sensors 112 sense electrical parameters, e.g., voltage and current, on incoming lines (i.e., phase A, phase B, phase C, neutral N) of an electrical power distribution system 111 e.g., an electrical circuit, that are coupled to at least one load 113 that consumes the power provided. In one embodiment, the sensors 112 will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 114 configured to convert the analog output voltage from the transformer to a digital signal that can be processed by the CPU 150, DSP1 160, DSP2 170, FPGA 180 or any combination thereof.

A/D converters 114 are respectively configured to convert an analog voltage output to a digital signal that is transmitted to a gate array, such as Field Programmable Gate Array (FPGA) 180. The digital signal is then transmitted from the FPGA 180 to the CPU 150 and/or one or more DSP processors 160, 170 to be processed in a manner to be described below.

The CPU 150 or DSP Processors 160, 170 are configured to operatively receive digital signals from the A/D converters 114 (see FIG. 1) to perform calculations necessary to determine power usage and to control the overall operations of the IED 100. In some embodiments, CPU 150, DSP1 160 and DSP2 170 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 180. In some embodiments, the digital samples, which are output from the A/D converters 114 are sent directly to the CPU 150 or DSP processors 160, 170, effectively bypassing the FPGA 180 as a communications gateway.

The power supply 116 provides power to each component of the IED 100. In one embodiment, the power supply 116 is a transformer with its primary windings coupled to the incoming power distribution lines and having windings to provide a nominal voltage, e.g., 5VDC, +12VDC and −12VDC, at its secondary windings. In other embodiments, power may be supplied from an independent power source to the power supply 116. For example, power may be supplied from a different electrical circuit or an uninterruptible power supply (UPS).

In one embodiment, the power supply 116 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor dividing power supplies are also contemplated.

The multimedia user interface 122 is shown coupled to the CPU 150 in FIG. 1 for interacting with a user and for communicating events, such as alarms and instructions to the user. The multimedia user interface 122 may include a display for providing visual indications to the user. The display may be embodied as a touch screen, a liquid crystal display (LCD), a plurality of LED number segments, individual light bulbs or any combination. The display may provide information to the user in the form of alpha-numeric lines, computer-generated graphics, videos, animations, etc.

The multimedia user interface 122 further includes a speaker or audible output means for audibly producing instructions, alarms, data, etc. The speaker is coupled to the CPU 150 via a digital-to-analog converter (D/A) for converting digital audio files stored in a memory 118 or non-volatile memory 120 to analog signals playable by the speaker.

The IED 100 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v .mpeg2), Microsoft Recorded TV Show files (.dvr-ms), Microsoft Windows Video files (.avi) and Microsoft Windows Audio files (.wav).

The IED 100 further comprises a volatile memory 118 and a non-volatile memory 120. In addition to storing audio and/or video files, volatile memory 118 will store the sensed and generated data for further processing and for retrieval when called upon to be displayed at the IED 100 or from a remote location. The volatile memory 118 includes internal storage memory, e.g., random access memory (RAM), and the non-volatile memory 120 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. By utilizing removable memory, an IED can be easily upgraded as needed. Such memory will be used for storing historical trends, waveform captures, event logs including timestamps and stored digital samples for later downloading to a client application, web-server or PC application.

In a further embodiment, the IED 100 will include a communication device 124, also know as a network interface, for enabling communications between the IED or meter, and a remote terminal unit, programmable logic controller and other computing devices, microprocessors, a desktop computer, laptop computer, other meter modules, etc. The communication device 124 may be a modem, network interface card (NIC), wireless transceiver, etc. The communication device 124 will perform its functionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection may operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite transmission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 100 may communicate to a server or other computing device via the communication device 124. The IED 100 may be connected to a communications network, e.g., the Internet, by any means, for example, a hardwired or wireless connection, such as dial-up, hardwired, cable, DSL, satellite, cellular, PCS, wireless transmission (e.g., 802.11a/b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/Internet Protocol (TCP/IP), File Transfer Protocol (FTP), Hypertext Transfer Protocol (HTTP), etc. and secure protocols such as Hypertext Transfer Protocol Secure (HTTPS), Internet Protocol Security Protocol (IPSec), Point-to-Point Tunneling Protocol (PPTP), Secure Sockets Layer (SSL) Protocol, etc. The server may further include a storage medium for storing a data received from at least one IED or meter and/or storing data to be retrieved by the IED or meter.

In an additional embodiment, the IED 100 may also have the capability of not only digitizing waveforms, but storing the waveform and transferring that data upstream to a central computer, e.g., a remote server, when an event occurs such as a voltage surge or sag or a current short circuit. This data may be triggered and captured on an event, stored to memory, e.g., non-volatile RAM, and additionally transferred to a host computer within the existing communication infrastructure either immediately in response to a request from a remote device or computer to receive said data in response to a polled request. The digitized waveform will also allow the CPU 150 to compute other electrical parameters such as harmonics, magnitudes, symmetrical components and phasor analysis. Using the harmonics, the IED 100 will also calculate dangerous heating conditions and can provide harmonic transformer derating based on harmonics found in the current waveform.

In a further embodiment, the IED 100 will execute an e-mail client and will send e-mails to the utility or to the customer direct on an occasion that a power quality event occurs. This allows utility companies to dispatch crews to repair the condition. The data generated by the meters are used to diagnose the cause of the condition. The data is transferred through the infrastructure created by the electrical power distribution system. The email client will utilize a POP3 or other standard mail protocol. A user will program the outgoing mail server and email address into the meter. An exemplary embodiment of said metering is described in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 100 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 2A:
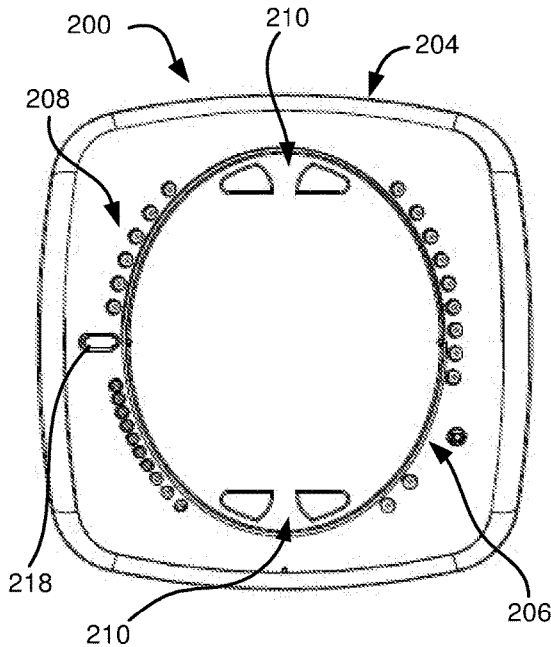
FIGS. 2A-2H illustrate exemplary form factors for an intelligent electronic device (IED) in accordance with an embodiment of the present disclosure.
Figure 2B:
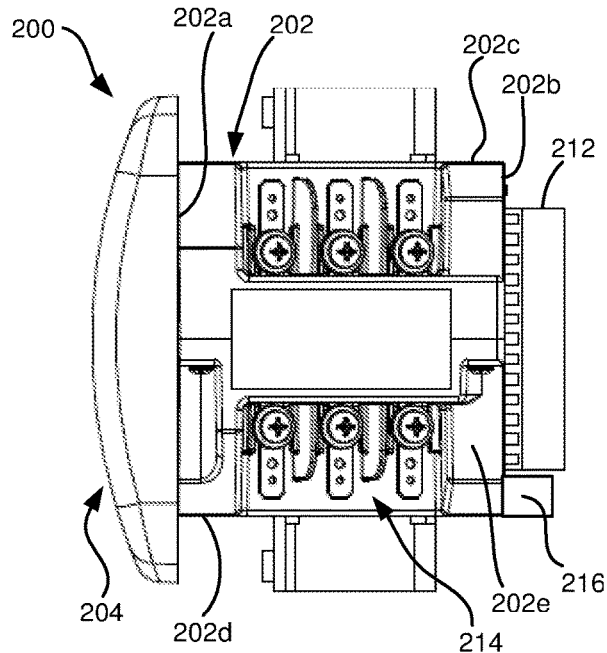

Furthermore, it is to be appreciated that the components and devices of the IED 10 of FIG. 1 may be disposed in various housings depending on the application or environment. For example, the IED 100 may be configured as a panel meter 200 as shown in FIG. 2A an 2B. The panel meter 200 of FIGS. 2A and 2B is described in more detail in commonly owned U.S. Pat. No. 7,271,996, the contents of which are hereby incorporated by reference. As seen in FIGS. 2A and 2B, the IED 200 includes a housing 202 defining a front surface 202a, a rear surface 202b, a top surface 202c, a bottom surface 202d, a right side surface 202e, and a left side surface (not shown). Electrical device 200 includes a face plate 204 operatively connected to front surface 202a of housing 202. Face plate 204 includes displays 206, indicators 208 (e.g., LEDs and the like), buttons 210, and the like providing a user with an interface for visualization and operation of electrical device 200. For example, as seen in FIG. 2A, face plate 204 of electrical device 200 includes analog and/or digital displays 206 capable of producing alphanumeric characters. Face plate 204 includes a plurality of indicators 208 which, when illuminated, indicate to the user the "type of reading", the "% of load bar", the "parameter designation" which indicates the reading which is being displayed on displays 206, a "scale selector" (e.g., Kilo or Mega multiplier of Displayed Readings), etc. Face plate 204 includes a plurality of buttons 210 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 202 includes voltage connections or inputs 212 provided on rear surface 202b thereof, and current inputs 214 provided along right side surface 202e thereof. The IED 200 may include a first interface or communication port 216 for connection to a master and/or slave device. Desirably, first communication port 216 is situated in rear surface 202b of housing 202. IED 200 may also include a second interface or communication port 218 situated on face plate 204.

Figure 2C:
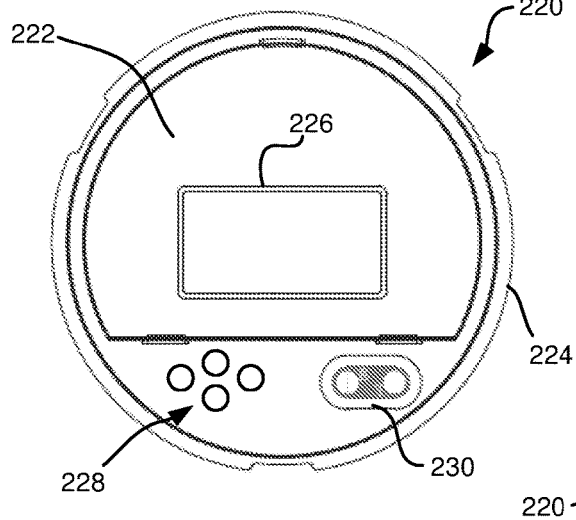
Figure 2D:
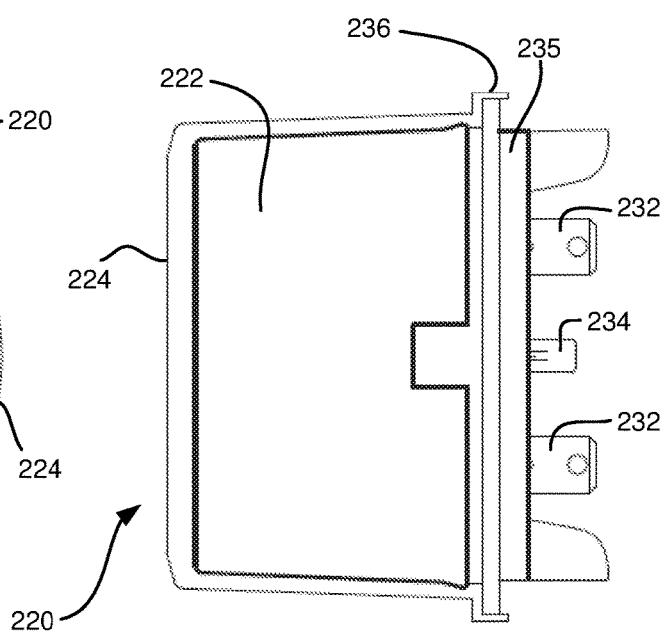

In other embodiment, the IED 100 may be configured as a socket meter 220, also known as a S-base type meter or type S meter, as shown in FIG. 2C an 2D. An exemplary socket meter is described in more detail in commonly owned U.S. Pat. No. 8,717,007, the contents of which are hereby incorporated by reference. Referring to FIGS. 2C and 2D, the meter 220 includes a main housing 222 surrounded by a cover 224. The cover 224 is preferably made of a clear material to expose a display 226 disposed on the main body 222. An interface 228 to access the display and a communication port 230 is also provided and accessible through the cover 224. The meter 220 further includes a plurality of current terminals 232 and voltage terminals 234 disposed on backside of the meter extending through a base 235. The terminals 232, 234 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 236 is used as a seal between the meter 220 and/or cover 224 and the meter socket to prevent removal of the meter and to indicate tampering with the meter.

Figure 2E:
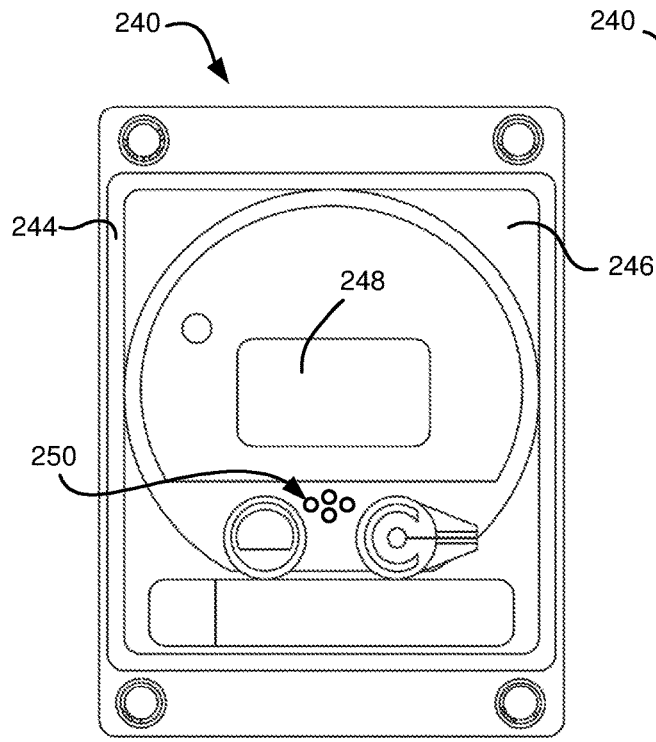
Figure 2F:
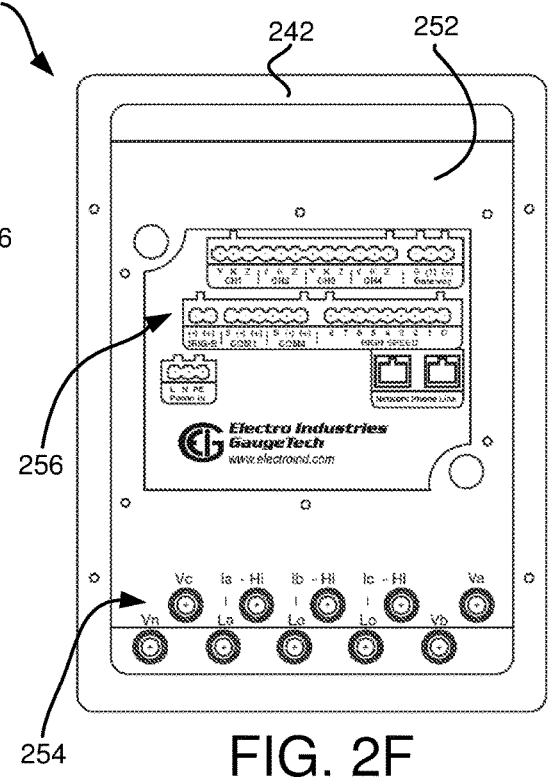

In a further embodiment, the IED 100 of FIG. 1 may be disposed in a switchboard or draw-out type housing 240 as shown in FIGS. 2E and 2F, where FIG. 2E is a front view and FIG. 2F is a rear view. The switchboard enclosure 242 usually features a cover 244 with a transparent face 246 to allow the meter display 248 to be read and the user interface 250 to be interacted with by the user. The cover 244 also has a sealing mechanism (not shown) to prevent unauthorized access to the meter. A rear surface 252 of the switchboard enclosure 242 provides connections for voltage and current inputs 254 and for various communication interfaces 256. Although not shown, the meter disposed in the switchboard enclosure 242 may be mounted on a draw-out chassis which is removable from the switchboard enclosure 242. The draw-out chassis interconnects the meter electronics with the electrical circuit. The draw-out chassis contains electrical connections which mate with matching connectors 254, 256 disposed on the rear surface 252 of the enclosure 242 when the chassis is slid into place.

Figure 2G:
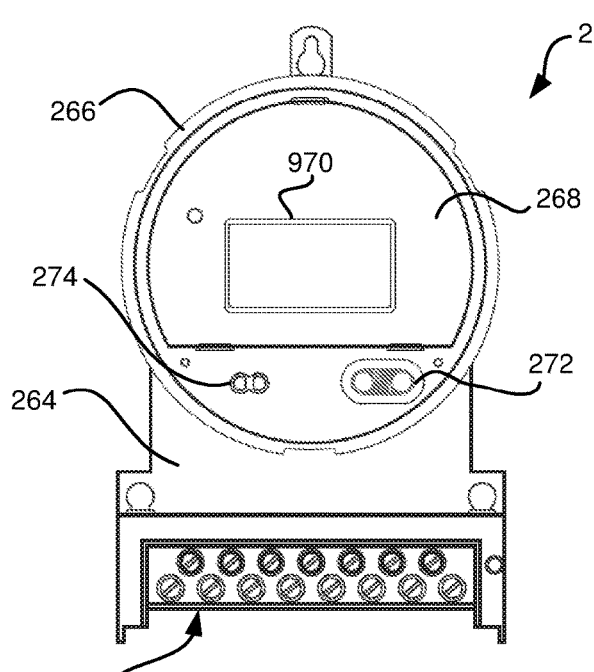
Figure 2H:
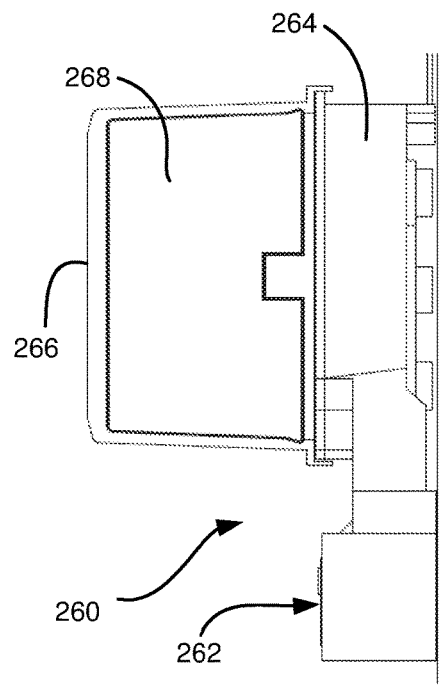

In yet another embodiment, the IED 100 of FIG. 1 may be disposed in an A-base or type A housing as shown in FIGS. 2G and 2H. A-base meters 260 feature bottom connected terminals 262 on the bottom side of the meter housing 264. These terminals 262 are typically screw terminals for receiving the conductors of the electric circuit (not shown). A-base meters 260 further include a meter cover 266, meter body 268, a display 270 and input/output means 272. Further, the meter cover 266 includes an input/output interface 274. The cover 266 encloses the meter electronics 268 and the display 270. The cover 266 has a sealing mechanism (not shown) which prevents unauthorized tampering with the meter electronics.

It is to be appreciated that other housings and mounting schemes, e.g., circuit breaker mounted, are contemplated to be within the scope of the present disclosure.

Figure 3:
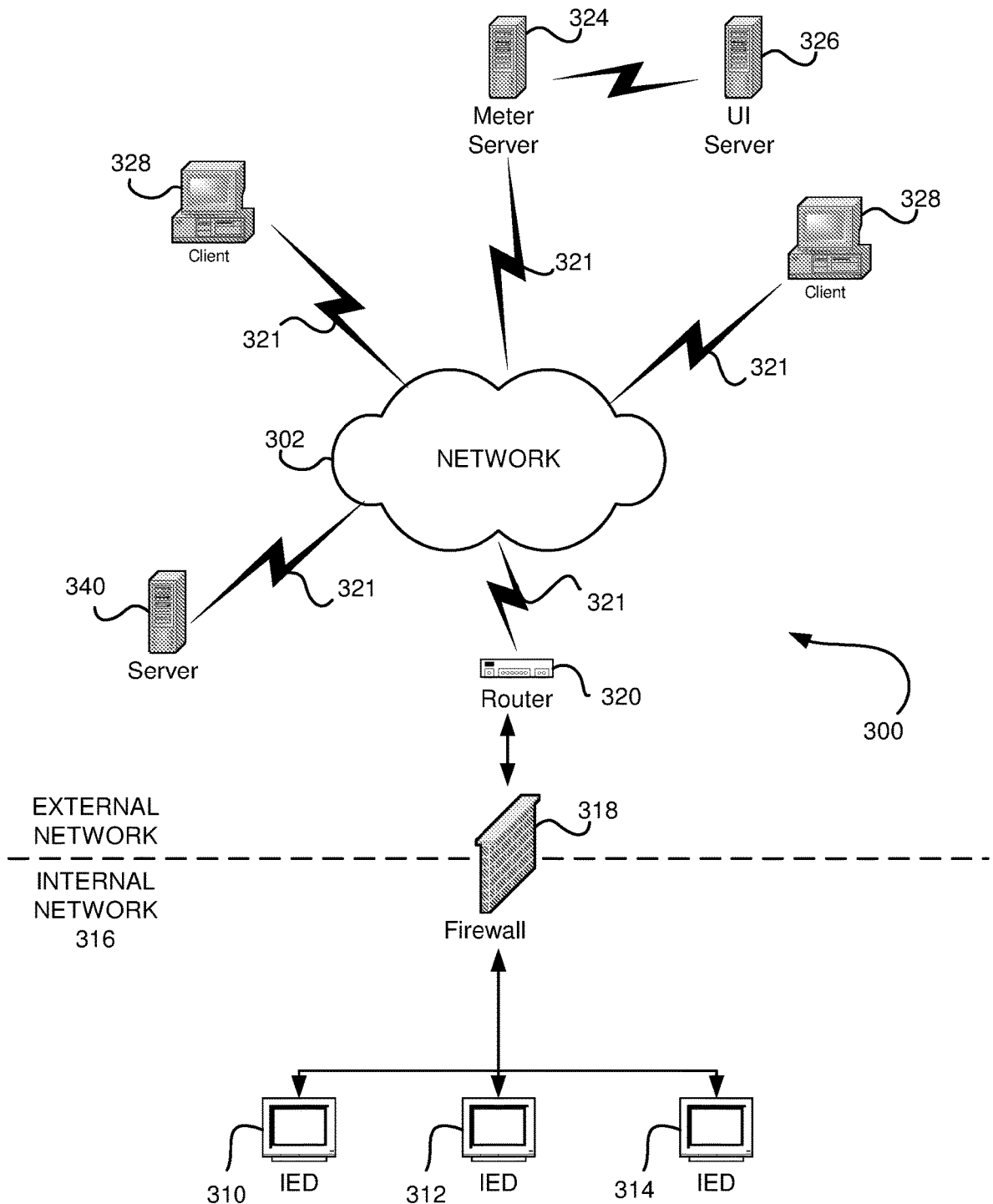
FIG. 3 illustrates an environment in which the present disclosure may be utilized.

FIG. 3 illustrates an exemplary environment 300 in which the present disclosure may be practiced. The environment 300 includes at least one IED 310, 312, 314 and at least one computing device, e.g., servers 324, 326, 340, clients 328, etc. The network 302 may be the Internet, a public or private intranet, an extranet, wide area network (WAN), local area network (LAN) or any other network configuration to enable transfer of data and commands. An example network configuration uses the Transport Control Protocol/Internet Protocol ("TCP/IP") network protocol suite, however, other Internet Protocol based networks are contemplated by the present disclosure. Communications may also include IP tunneling protocols such as those that allow virtual private networks coupling multiple intranets or extranets together via the Internet. The network 302 may support existing or envisioned application protocols, such as, for example, telnet, POP3, Mime, HTTP, HTTPS, PPP, TCP/IP, SMTP, proprietary protocols, or any other network protocols. During operation, the IED(s) may communicate using the network 302 as will be hereinafter discussed.

It is to be appreciated that are at least two basic types of networks, based on the communication patterns between the machines: client/server networks and peer-to-peer networks. On a client/server network, every computer, device or IED has a distinct role: that of either a client or a server. A server is designed to share its resources among the client computers on the network. A dedicated server computer often has faster processors, more memory, and more storage space than a client because it might have to service dozens or even hundreds of users at the same time. High-performance servers typically use from two to eight processors (and that's not counting multi-core CPUs), have many gigabytes of memory installed, and have one or more server-optimized network interface cards (NICs), RAID (Redundant Array of Independent Drives) storage consisting of multiple drives, and redundant power supplies. Servers often run a special network OS—such as Windows Server, Linux, or UNIX—that is designed solely to facilitate the sharing of its resources. These resources can reside on a single server or on a group of servers. When more than one server is used, each server can "specialize" in a particular task (file server, print server, fax server, email server, and so on) or provide redundancy (duplicate servers) in case of server failure. For demanding computing tasks, several servers can act as a single unit through the use of parallel processing. A client device typically communicates only with servers, not with other clients. A client system may be a standard PC that is running an OS such as Windows, Linux, etc. Current OSes contain client software that enables the client computers to access the resources that servers share. Older OSes, such as Windows 3.x and DOS, required add-on network client software to join a network. By contrast, on a peer-to-peer network, every computer or device is equal and can communicate with any other computer or device on the network to which it has been granted access rights. Essentially, every computer or device on a peer-to-peer network can function as both a server and a client; any computer or device on a peer-to-peer network is considered a server if it shares a printer, a folder, a drive, or some other resource with the rest of the network. Note that the actual networking hardware (interface cards, cables, and so on) is the same in client/server versus peer-to-peer networks, it is only the logical organization, management and control of the network that varies.

A client may comprise any computing device, such as a server, mainframe, workstation, personal computer, hand-held computer, laptop telephony device, network appliance, an IED, Programmable Logic Controller, Power Meter, Protective Relay etc. The client may include system memory, which may be implemented in volatile and/or non-volatile devices, and one or more client applications which may execute in the system memory. Such client applications may include, for example, FTP client applications. File Transfer Protocol (FTP) is an application for transfer of files between computers attached to Transmission Control Protocol/Internet Protocol (TCP/IP) networks, including the Internet. FTP is a "client/server" application, such that a user runs a program on one computer system, the "client", which communicates with a program running on another computer system, the "server". In one embodiment, IED 310 includes at least an FTP server.

While FTP file transfer comprises one embodiment for encapsulating files to improve a data transfer rate from an IED to external clients, the present disclosure contemplates the use of other file transfer protocols, such as the Ethernet protocol such as HTTP or TCP/IP for example. Of course, other Ethernet protocols are contemplated for use by the present disclosure. For example, for the purpose of security and firewall access, it may be preferable to utilize HTTP file encapsulation as opposed to sending the data via FTP. In other embodiments, data can be attached as an email and sent via SMTP, for example.

Although the above described embodiments enable users outside of the network the IED or meter is residing on to access the internal memory or server of the IED or meter, IT departments commonly block this access through a firewall to avoid access by dangerous threats into corporate networks. A firewall is a system designed to prevent unauthorized access to or from a private network, e.g., an internal network of a building, a corporate network, etc. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. A firewall may employ one or more of the following techniques to control the flow of traffic in and of the network it is protecting: 1) packet filtering: looks at each packet entering or leaving the network and accepts or rejects it based on user-defined rules; 2) Application gateway: applies security mechanisms to specific applications, such as FTP and Telnet servers; 3) Circuit-level gateway: applies security mechanisms when a TCP or UDP connection is established, once the connection has been made, packets can flow between the hosts without further checking; 4) Proxy server: intercepts all messages entering and leaving the network, effectively hides the true network addresses; and 5) Stateful inspection: doesn't examine the contents of each packet but instead compares certain key parts of the packet to a database of trusted information, if the comparison yields a reasonable match, the information is allowed through, otherwise it is discarded. Other techniques and to be developed techniques are contemplated to be within the scope of the present disclosure.

In one embodiment, the IED or metering device will communicate through the firewall using a protocol such as HTTP via a port that is open through the firewall. Referring to FIG. 3., IEDs or meters 310, 312, 314 reside on an internal network 316, e.g., an intranet, private network, corporate network, etc. The internal network 316 is coupled to an external network 302, e.g., the Internet, via a router 320 or similar device over any known hardwire or wireless connection 321. A firewall 318 is disposed between the internal network 316 and external network 302 to prevent unauthorized access from outside the internal network 316 to the IEDs or meters 310, 312, 314. Although the firewall 318 is shown between the internal network 316 and the router 320 it is to be appreciated that other configurations are possible, for example, the firewall 318 being disposed between the router 320 and external network 302. In other embodiments, the firewall 318 and router 320 may be configured as a single device. It is further to be appreciated that firewall 318 can be implemented in both hardware and software, or a combination of both.

The communication device or network interface of the meter (as described above in relation to FIG. 1) may communicate through the firewall 318 and read a web site server 324. It is to be appreciated that the one way communication from the IED through the firewall may be enabled by various techniques, for example, by enabling outbound traffic to the IP address or domain name of the server 524 or by using a protocol that has been configured, via the firewall settings, to pass through the firewall such as HTTP (Hyper Text Transfer Protocol), IP (Internet Protocol), TCP (Transmission Control Protocol), FTP (File Transfer Protocol), UDP (User Datagram Protocol), ICMP (Internet Control Message Protocol), SMTP (Simple Mail Transport Protocol), SNMP (Simple Network Management Protocol), Telnet, etc. Alternatively, the IED may have exclusive access to a particular port on the firewall, which is unknown to other users on either the internal or external network. Other methods or techniques are contemplated, for example, e-mail, HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc.

In another embodiment, the IED or metering device will communicate through the firewall using a server (not shown) disposed on an internal network protected by a firewall. In this embodiment, the server aggregates data from the various IEDs 310, 312, 314 coupled to the internal or private network 316. Since the server and the IEDs 510, 312, 314 are all on the same side of the firewall 318, generally communications and data transfers among the server and the IEDs 310, 312, 314 is unrestricted. The server then communicates or transfers the data from the IEDs to server 324 on the external network on the other side of the firewall 318. The communication between server on the internal network and server 324 may be accomplished by any one of the communication means or protocols described in the present disclosure.

In a further embodiment, the server disposed on the internal network communicates or transfers the data from the IEDs to clients 328 on the external network on the other side of the firewall 318, without the need to transfer or pass data to a server on the external network.

In another embodiment, each IED 310, 312, 314 may be configured to act as a server to perform the functionality described above obviating the need for a separate server.

Furthermore, in another embodiment, each IED 310, 312, 314 and each client device 328 may be configured as a server to create a peer-to-peer network, token ring or a combination of any such topology.

The systems and methods of the present disclosure may utilize one or more protocols and/or communication techniques including, but not limited to, e-mail, File Transfer Protocol (FTP), HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc. Common chat protocols, such as MSN, AIM, IRQ, IRC, and Skype, may be used to send a message, containing the meter's data, to a public chat server which may then route that message to any desired client. A public social server that supports a common web interface for posting information, such as Twitter™, Facebook™, BBS's, may be used to post a status, containing the meter's data, to a user on the public social server for that service. This post may then be viewed by the clients to see the meter's data, or read by another server for further parsing and presentation. Hosted data services, such as a hosted database, cloud data storage, Drop-Box, or web service hosting, may be used as an external server to store the meter's data, called Hosting. Each of these Hosts, e.g., server 540, may then be accessed by the clients to query the Hosted Data. In another embodiment, the IEDs can communicate to devices using Generic Object Oriented Substation Event (GOOSE) messages, as defined by the IEC-61850 standard, the content of which are herein incorporated by reference.

Security in meters has been a traditionally overlooked feature in the power industry. This has been due to a number of factors, including the use of serial networks, limited connectivity of wider access networks, and a resistance of consumers to upgrade their devices. When security is implemented in devices, it is often added as an afterthought, using simple numeric passwords, and little to no configurability. Worse, even when complex passwords are allowed, users will often use simple passwords that they repeat for every device on their network, due to the complexity of maintaining all those devices.

Figure 4:
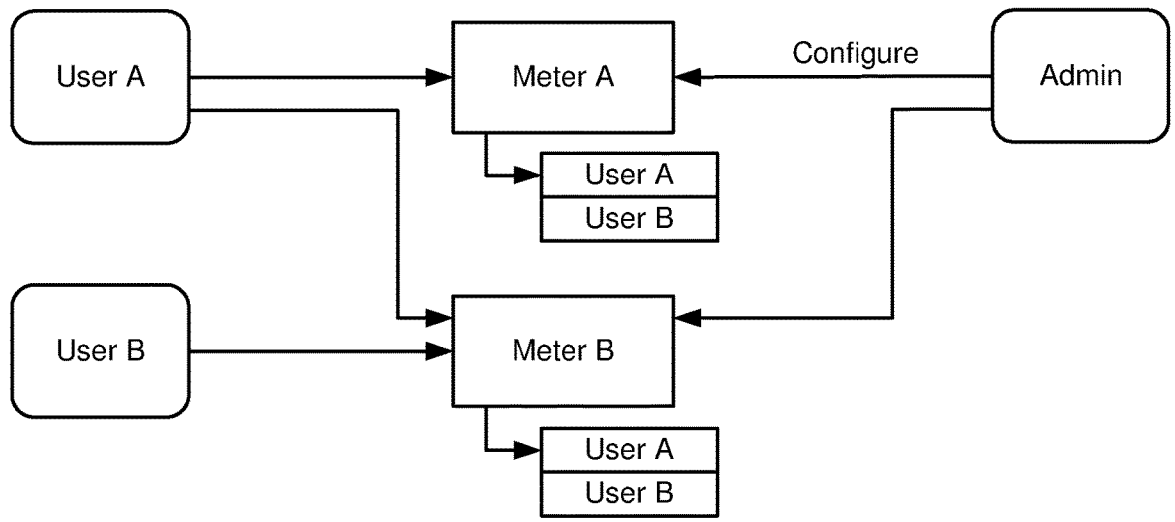
FIG. 4 illustrates a security configuration where credentials for each user are configured individually in each meter.

In a traditional system, each meter would be configured with individual security configurations, where a security configuration is the set of credentials that a user requires to gain access to the critical functionality of a meter. For example, in the example shown in FIG. 4, the credentials for User A would have to be configured individually in Meter A and in Meter B. For a large number of meters, this configuration may take hours or days to perform, which would encourage administrators to use the same password for all meters.

Additionally, after configuration, if User B needs to be removed, the configuration process would need to be performed for each device again, removing or disabling User B. Not only is this time consuming, it is error prone; if the administrator misses one meter, the old credentials can still be used, possibly allowing compromise.

Figure 5:
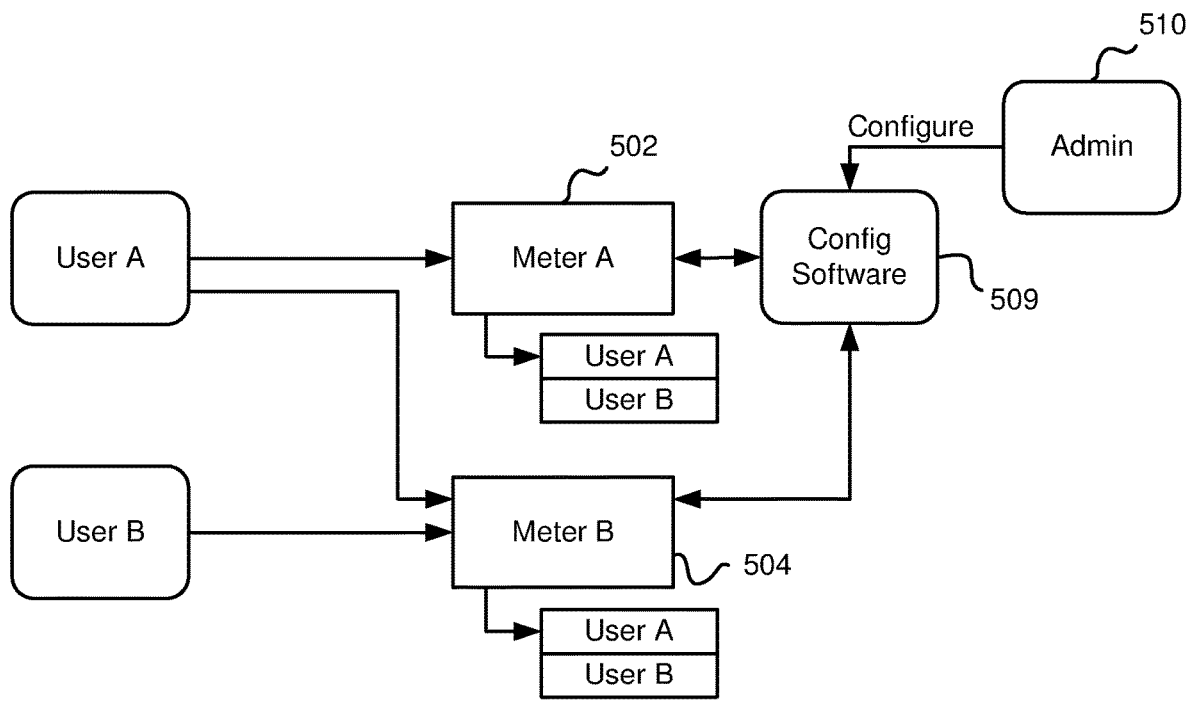
FIG. 5 illustrates a security configuration where credentials for each user are configured from a single interface in accordance with the present disclosure.

One solution to individual security configuration in meters is an administrative security configuration software, e.g., executing on a server, that maintains the security configuration of all meters on a network, as shown in the example of FIG. 5. Such a security configuration software 509 may allow an administrator 510 to add, remove, or update the security credentials for all meters, e.g., meters 502, 504, from a single interface generated by the software and/or server (e.g., an interface such as, but not limited to, a web page). The software may then perform the configuration change on the meter for the user. Such a solution may improve the management and security in meters by centralizing the configuration of security, reducing the possibility of misconfiguration.

Additionally, this software may perform the action on groups, ranges, or all meters automatically, allowing the administrator to perform a single action on all the devices, without risk of misconfiguration. For example, if a user needed to be disabled in all the meters, the administrator may click Disable on the user for all meters, and the software would go to each meter, and disable that user, eliminating the possibility that the administrator may forget a meter, or disable the wrong user.

Figure 6:
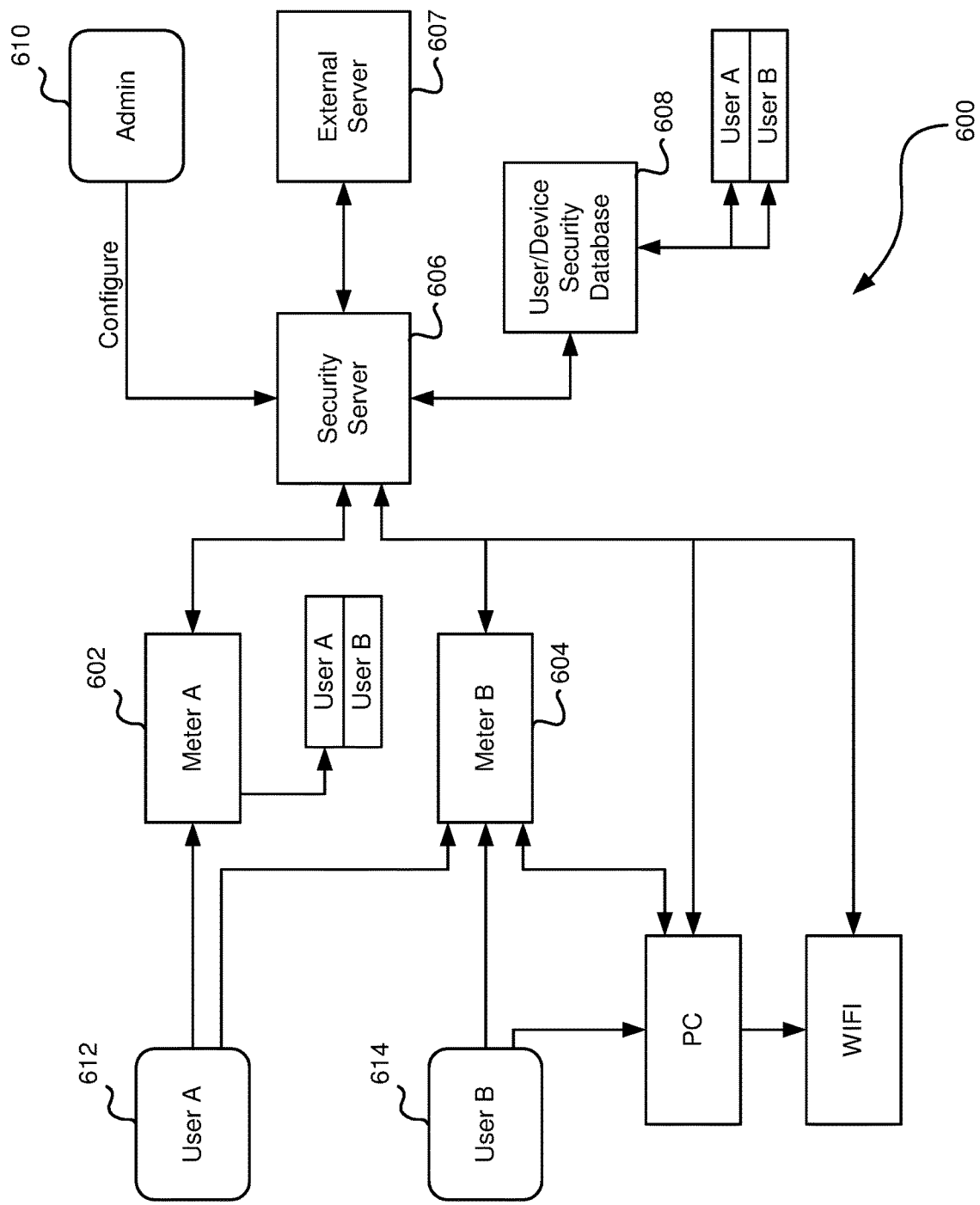
FIG. 6 illustrates a centralized security system in accordance with an embodiment of the present disclosure.

Another solution is a system 600, as illustrated in FIG. 6, wherein meters 602, 604 on a network use a security server 606 for its security configurations and validations, rather than relying on security configured in each meter individually. Security server 606 provides centralized security to system 600. Users would continue to login as usual through client softwares, however all meter security configuration would go through the security server 606. In such a system 600, the security server 606 would not need to, though may, know the network address of the meter.

In one implementation of a security server 606, a meter may pull its security configuration from the security server 606 (e.g., periodically or on command) to maintain a local security database, as in example Meter A 602, where Meter A 602 includes at least the credentials for User A and User B. The meter would still maintain a local security configuration, which would be used for all user authentication and authorization checks. The security server 606 may maintain a mapping of meters and user credentials, which the meter may then periodically check the security server 606 for changes, and if a change was detected, the meter may update its local security configuration. It is to be appreciated that the local security database or configuration may be stored in a memory, such as memory 118 and/or memory 120 as shown in the meter/IED 100 of FIG. 1.

Security server stored configuration may be improved by allowing the security server 606 to notify the meter that a security configuration has changed. Once the meter receives this notification, the meter may then query the security configuration update from the security server 606. For example, the security server 606 may send a Modbus command to the meter, to notify the meter that the Security Configuration of the meter was updated. As another example, the security server 606 may send a HTTP POST command to the meter. As another example, the security server 606 may broadcast a UDP to all devices on the network, notifying the meters that a Security Configuration update is available. Other possible notification protocols are envisioned.

Security server stored configuration may be further improved by storing security configuration parameters other than credentials. For example, an administrator 610 may configure Meter A 602 to only allow 1 login attempt every 5 seconds by storing that configuration on the security server 606, and Meter A 602 would implement this configuration when Meter A 602 is updated from the security server 606. As another example, the administrator 610 may, through the security server 606, configure Meter B 604 to disable any login attempts from the serial port of the Meter B 604.

Security server stored configuration may be further improved by storing non-security configuration parameters. For example, the administrator 610 may configure the device profile of Meter A 602 by storing that profile on the security server 606, along with a command to Meter A 602 to use the new profile. Meter A 602 would then install and use this profile when updated from the security server 606. As another example, individual device profile settings may be configured on Meter B 604 through the Lightweight Directory Access Protocol (LDAP) settings profile of the Meter B 604. As LDAP is a tag/value storage system for users, each setting may be stored as an individual entry. As an illustrative example, the following list of tags and values for an individual LDAP entry may be used to store and configure the current transformer/potential transformer (CT/PT) ratios of a meter, represented in LDAP Data Interchange Format (LDIF):

meterCtPrimary: 400
meterCtSecondary: 5
meterPtPrimary: 1440
meterPtSecondary: 120
meterHookup: WYE3

It is envisioned that when the meter synchronizes with this configuration from the LDAP server, i.e., security server 606, it may then update its CT/PT ratios as appropriate. It is to be appreciated that security server 606 may be one server or a complex of servers to provide interdependent features such as LDAP and Active Directory.

In another implementation of a security server 606, when the meter 602, 604 receives an authentication or authorization request from a user, the meter 602, 604 may query the user credentials directly from the security server 606 for verification (e.g., rather than querying user credentials against a local security database in the meter), as in example Meter B. In such an implementation, the meter 602, 604 would not store the user credentials locally, but would instead rely on communications with the security server 606. For example, when a user attempts to login to the meter 602, 604, the meter 602, 604 may query the security server 606 for the user's credentials, then compare them locally. As another example, when a user which has already been authenticated tries to perform a secure action, the meter 602, 604 may query the security server 606 to determine if the user has the permission to perform that action.

Such querying of the security server 606 may be improved by caching the user's credentials locally, and only requerying the security server 606 when those credentials have expired. For example, when the meter 602, 604 queries a user's credentials from the security server 606, the credentials may include an expiration date of one hour. All login attempts by the user during that hour would be compared against the local credentials; after the expiration however, a new credentials would be queried from the security server 606 for validation. It is also envisioned that other methods of configuring the local cache credential expiration may be used, such as a hard coded or configurable setting in the meter 602, 604 itself.

Such caching of credentials may be improved by only storing a limited number of credentials in the cache. If credentials were added to the cache, and the number of credentials stored in the cache exceeded the limit, the oldest credentials would be discarded. It is envisioned that this limit may be hardcoded, or configurable through either the meter 602, 604 itself, or though the security server 606.

Such querying of the security server 606 may be improved in another way, for example, by never transferring the user credentials from the security server 606 to the meter 602, 604. Instead, the meter 602, 604 would send the User Credentials to test to the security server 606, and the security server 606 would respond with their validity. In such a system, the user credentials would never be transferred out of the security server 606, reducing the possibility of an unintended information leak. Additionally, an arbitrary number of users may be given access to the meter 602, 604, since the security configuration would not be limited by the storage capabilities of the meter 602, 604 itself. For example, when a user attempts to login to the meter 602, 604, the meter 602, 604 may send the user credentials to the security server 606, and the security server 606 may respond with the validity of those credentials.

Such querying of the security server 606 may be improved by combining the local cache with validate only queries. In such an implementation, the security server 606 would never transfer valid user credentials to the meter 602, 604, but instead the meter 602, 604 caches the credentials provided by the user when the meter 602, 604 receives a validity response from the security server 606. For example, if a user's credentials were correct when validated against the security server 606, the meter 602, 604 may cache those credentials such that the next time the user sends those credentials, the credentials are validated against the local cache, rather then sending another validation request to the security server 606. As another example, if a user's credentials were incorrect when validated against the security server 606, the meter 602, 604 may cache those invalid credentials, and reject later attempts with those credentials without sending another validation request. As another example, if valid credentials are cached, and invalid credentials are supplied, the credentials may be rejected without sending another validation request.

Such querying of the security server 606 may also be improved by limiting the number of requests that can be made against the security server 606. For example, a meter 602, 604 may only allow sending one credential verification per second. As another example, a meter 602, 604 may limit credential verifications per user to one a second.

In another implementation of a security server 606, instead of configuring individual lists of user credentials for each meter 602, 604, a single list of user credentials may be created, and all meters 602, 604 may use that list for validation. In such a system, a user may then apply the same credentials to every meter, thus simplifying the login process. It is envisioned that such a system, security may be improved by not forcing users to store many different credentials, while at the same time allowing more complex security configurations. For example, the administrator 610 may configure User A 612 in the security server 606, and User A 612 may then login to Meter A 602 and Meter B 604 with the same credentials, without the administrator 610 having to configure User A 612 for each meter 602, 604. As another example, User B 614 may have their password changed by the administrator 610, and Meter A 602 and B 604 would both see the change without explicit configuration.

Such common user credentials may be improved by listing what meters 602, 604 each user has access to, as part of their configuration in the security server 606. For example, User A 612 may be configured to have access to Meter A 602, but not Meter B 604. When User A 612 attempts to login to Meter B 604, even if the credentials are valid for User A 612, they will be rejected as if they were invalid. Alternatively, they may be rejected with an invalid permission message.

Centralized Security may be improved by controlling User Access Permissions through Groups, such that each User would be a member of one or more Groups, and Access Permissions would be configured on those Groups. In this way, permissions are centralized and configured through shared groups. It is envisioned that such a system would simplify administration by allowing an administrator to configure Access Permissions for multiple Users simultaneously, by editing a single Group. For example, all Users which perform the initial wiring hookup of the meter 602, 604 may be assigned to a Group "technicians", which allows access to readings, but not firmware updates. As another example, all Users at Facility A may be assigned to a Group "facility_a", which allow access to meters at Facility A, but not meters at Facility B. As another example, technicians at Facility A may be assigned to both Groups "technicians" and "facility_a", providing both sets of Access Permissions.

It is appreciated that Group Access Permissions may be implemented in multiple fashions, depending on how Access Permissions are checked with the security server 606. For example, the meter may store a list of Permissions for each User, that is just the logical OR of all configured Groups. As another example, the meter may store a list of all Groups and their Access Permissions, and the Group membership of each User. Then it may iteratively check each member Group for the appropriate Access Permission when authorizing a User. As another example, when the meter 602, 604 requests authorization for a User with the security server 606, the security server 606 may check the aggregate of member Group Access Permissions for the specified User.

Group Access Permissions may be improved by allowing additional Access Permissions to be added or removed from a specific User, above and beyond the Access Permissions provided by their Group Memberships. For example, User B which is a member of the "technicians" group may be given the special added Access Permission to reset energy. This permission would only be accessible to User B, and not User A, which is also a member of Group "technicians". As another example, User C which is a member of "facility_a" group may have access to Meter D, which is a meter that is at Facility A. Other members of "facility_a" would still have access to Meter D.

Another implementation of Group Access Permissions may be to use the existing Group Access Permission methodologies of Common Protocols and Security Servers. For example, Windows Active Directories organize users under Group Membership, and Groups have a set of common permissions, such as Read, Write, Special, and Full Control, on objects managed by Active Directory. In such a system, meters 602, 604 may be designated as nodes in the Active Directory, and features of the meter, such as Updating Firmware, Reading Logs, and Updating Device Profiles, may be designated as Active Directory objects to be managed.

Centralized Security may be improved by providing an audit of the current security configuration of all the meters. For example, a report that lists the users that are permitted to login to each meter 602, 604 may be created by security server 606. As another example, a report that lists all meters 602, 604 a user can access may be created by security server 606. As another example, a report that lists all configured permissions across all meters 602, 604 may be created by security server 606. As another example, a report that lists all users which belong to an access permission group may be created by security server 606. As another example, the current non-credential security profiles, such as login time outs, may be listed for each meter 602, 604 when security server 606 creates the report.

Security Audits may be improved by storing a Security Log on the security server 606, that may track all Security Actions performed against the security server 606. It is envisioned that such a Security Log may be handled by a custom engine, or a common tool such as syslogd. For example, the security server 606 may log each authorization request by a meter 602, 604 for a User's Credentials. As another example, the security server 606 may log each permission check performed by a meter 602, 604. As another example, the security server 606 may log each security configuration request made by a meter 602, 606. As another example, the security server 606 may log a meter's access validation results.

Such Security Logs may be improved by providing commands between the meter 602, 604 and security server 606, such that the meter 602, 604 may report security events in the meter 602, 604 itself to the security server 606, which in turn would add the event to its log. Such a command may be performed using a custom protocol, or a common protocol, such as syslog or LDAP. For example, the meter 602, 604 may log each time a User reset energy in the meter 602, 604. As another example, the meter 602, 604 may log each time the firmware was updated. As another example, the meter 602, 604 may log each time the meter 602, 604 is powered up, and the possible reason it shut off. As another example, the meter 602, 604 may log performance changes, such as running slower than expected, as this may indicate an attack. It is envisioned that such performance changes may include, but not be limited to, a drop in CPU cycles, a real time task falling behind expected time slots, timed events taking longer than a threshold, or events per second exceeding a threshold. Such events may include, but is not limited to, TCP Packets arriving, ICMP packets, Modbus queries, Web Server queries, Web Service queries, Login attempts, PQ Log events, or System Event Log events.

Such Security Logs may be improved by providing reports (e.g., generated by security server 606) on the events logged. For example, a report of all events which occurred on Meter A 602, between 2019 Jan. 1 and 2019 Feb. 1 may be generated by security server 606. As another example, a report of all events which occurred for all meters 602, 604 between 2019 Feb. 1 and 2019 Feb. 2 may be generated by security server 606. As another example, a report of all failed logins on all meters 602, 604 at Facility A between 2019 Feb. 3 11:00 and 2019 Feb. 3 12:00 may be generated by security server 606.

Such Security Logs may be further improved by providing the ability to send security events to an external server for logging. Such an external server may then be used as backup, log comparison and verification, analysis, and reporting. For example, the security server 606 may automatically send a batch file of events to an external server 607, as shown in FIG. 6, which may then import those events. As another example, the administrator 610 may manually export a selected range of events, and manually import them to an external server 607. As another example, the security server 606 may automatically route the events to the external server 607 in syslog format, as each event comes into the security server 606.

Such Security Logs may be further improved by feeding the logs into a SIEM, or Security Information and Event Management system, thus enabling SIEM analysis. For example, such a system may be used to aggregate security events between Meter events, and other systems, such as Windows and Linux Host events. As another example, the SIEM may be used to alert the administrator 610 when specified events are detected, a threshold of event occurrences is detected, or a combination of events occurs, such as more than 100 logins across all meters 602, 604 in a single second. As another example, the SIEM may be used to display log events in a dashboard format, for easy visualization, such as graphing the number of logins every minute over a day. As another example, the SIEM may be used for cybersecurity forensics analysis, by allowing an analyst to search and filter for specific aggregates of events, such as finding all logins which come from a specific IP address. It is envisioned that such SIEM integration may be performed by the security server 606 as described here, or by the meter itself, e.g., meter 602, 604.

Such integration with a SIEM may be improved by using a common Security Log format, such as the syslog format, and include parseable tags in the message field. For example, User login attempts may be represented as, but would not be limited to, the following:

In another implementation of a security server 606, the protocol used between the meter, e.g., meters 602, 604, and security server 606 may include LDAP, RADIUS, Diameter, Kerberos, etc, to configure and verify users. For example, LDAP may be used to pull the user's security configuration from the security server 606. As another example, RADIUS or Diameter may be used for user credentials validation requests. As another example, Kerberos may be used for both configuration requests, and credentials validation requests.

In another implementation of a security server system, the meter 602, 604 may integrate with a customer's preexisting security server, such as a RADIUS Server, a Windows Active Directory Server, or a general LDAP Server. In such an arrangement, the meter 602, 604 would be configured to communicate and authenticate with the preexisting security server by the administrator. Additionally, the meter 602, 604 would use the security server's common protocol, such as RADIUS or LDAP, for communications with the security server.

Figure 7:
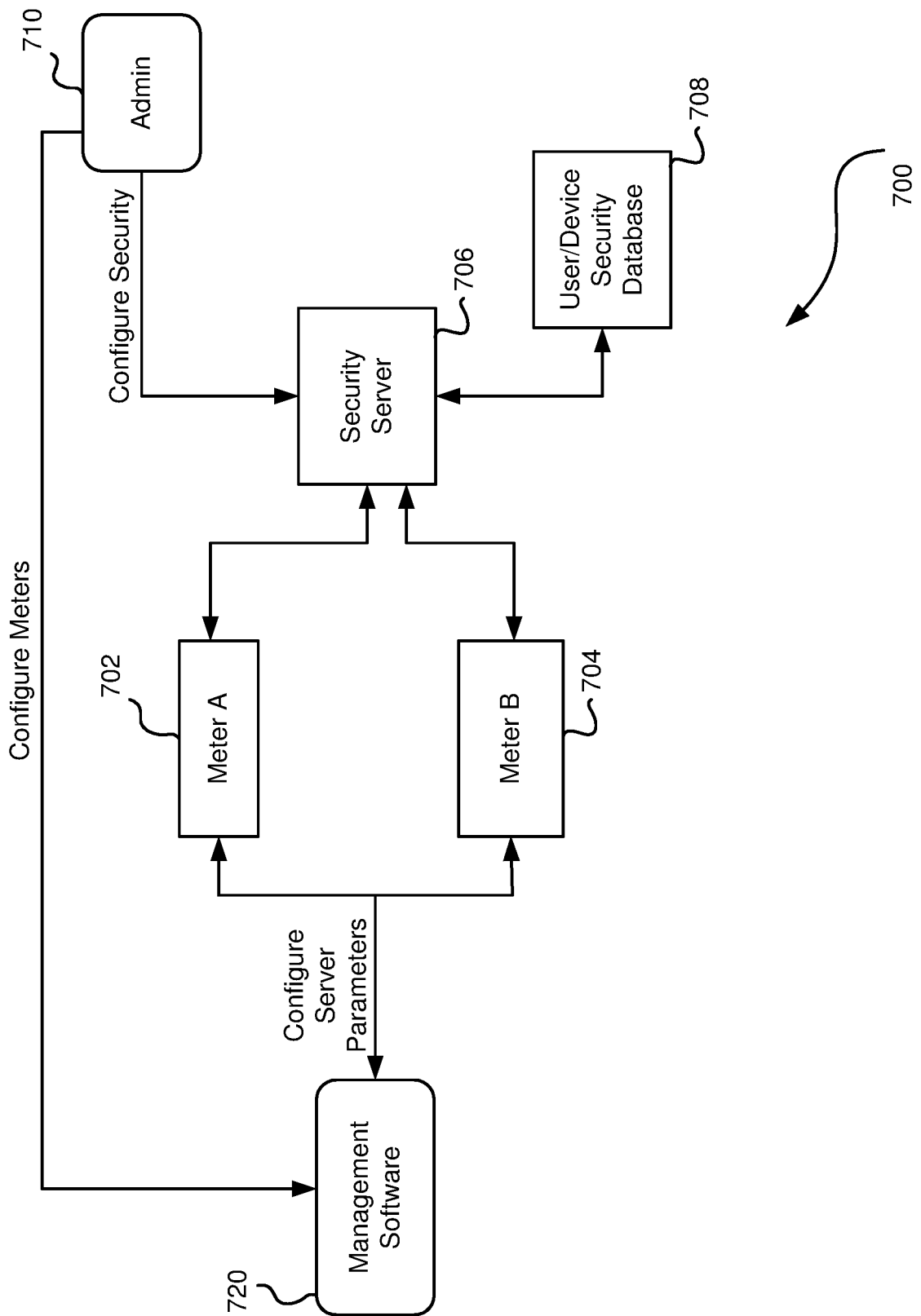
FIG. 7 illustrates a centralized security system in accordance with another embodiment of the present disclosure.

Using a preexisting security server may be improved by using a management software 720 that is aware of the communications settings for all the meters, such that the management software 720 is able to automatically configure the meters with the security server's configuration, as shown in FIG. 7. For example, if the management software 720 knows about Meter A 702 and Meter B 704, i.e., the management software 720 has or has access to the information on how to communicate and configure each meter, the admin 710 may use the management software 720 to configure Meter A 702 and Meter B 704 with the security server's parameters, e.g., an IP address, VPN credentials, login credentials, security certificates, etc. Meter A 702 and Meter B 704 would then use those security server parameters to connect to the security server 706 for their security configuration. It is to be appreciated that the management software 720 may automatically update each meter in the fleet, reducing configuration error. It is also envisioned that the security server 706 may be the management software 720.

While it is important for users to be properly authenticated and authorized by the meters, the meters themselves need to be verified when connecting to the security server 606, 706, i.e., meter-server security. Without this, an attacker may interact with the security server 506, 606, 706 directly without restriction.

```
Apr. 17, 2019   11:33:28   E159-0123456789   EIG:0|EIG|E159__Run|v4.3|101|msg=User
    user1@test.com   login|1|eig-loc=Login__Success   eig-user=user1@test.com   eig-
    raddr=10.153.10.82:54312 eig-session=78338A13-F98C-4EF8-A829-0260AF25DCDE
Apr. 17, 2019   11:33:29   E159-0123456789   EIG:0|EIG|E159 Run|v4.3|102|msg=User
    user2@test.com   login|5|eig-loc=Login__Failed   eig-user=user2@test.com   eig-
    raddr=10.153.10.85:11112 eig-reason=InvalidPassword
```

Such Security Logs may be further improved by feeding the logs into an IDS, or Intrusion Detection System, thus enabling IDS analysis. An IDS is a system which aggregates Network based events and Host based events, attempts to analyze them, and flag events which might be caused by an intrusion by an attacker. Such an IDS may then monitor events which occur on meters 602, 604, and alert administrators to possible intrusion attempts on those meters 602, 604. It is envisioned that the Security Log may be expanded to include Host information, such as firmware and file versions and signatures, to support better analysis by an IDS.

Additionally, if authentication information between the meter and security server is sent in the clear, even if the login process with the meter itself were protected from eavesdropping, an attacker may still listen to the authentication commands sent between the meter and security server.

One solution to authenticating the meter with the security server may be to include credentials with the security server configuration written to the meter. In one implementation of such meter credentials, a username/password pair may be used to authenticate the meter to the security server. For example, a username and password may be created for each meter, which would then be used by the meter when contacting the security server to authenticate the meter, before performing any other security actions. As another example, a single username and password may be created for each meter. As another example, the usernames and passwords of regular users may be used.

Figure 8A:
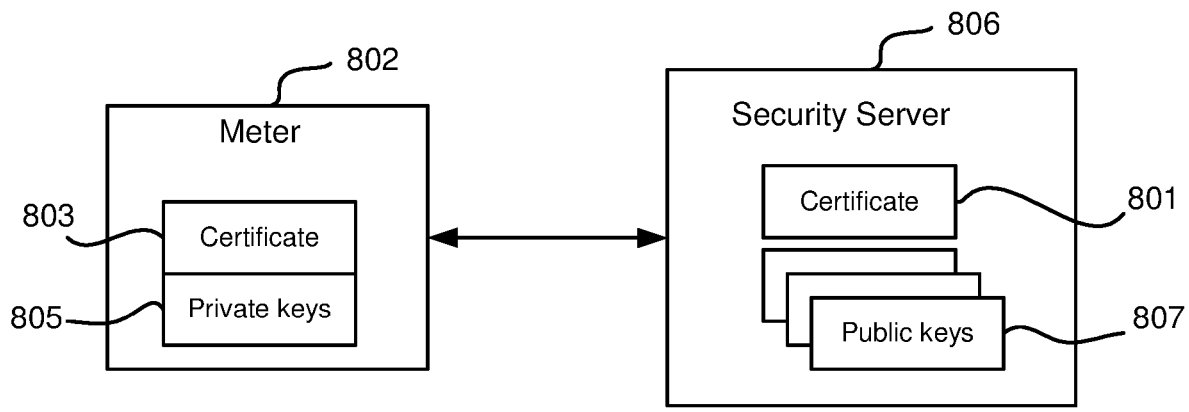
FIG. 8A illustrates an authentication system using certificates in accordance with an embodiment of the present disclosure.

Another implementation of meter credentials may be to provide the meter with a client certificate, which the security server would verify to authenticate the meter. For example, referring to FIG. 8A, security server 806 may generate a certificate for each meter 802, which may then be written as part of the security server configuration to the meter. The meter 802 may then provide that certificate to the security server 806 for authentication, before performing any other security services. As another example, meter's may all be configured with a single certificate generated by the security server 806.

Figure 8B:
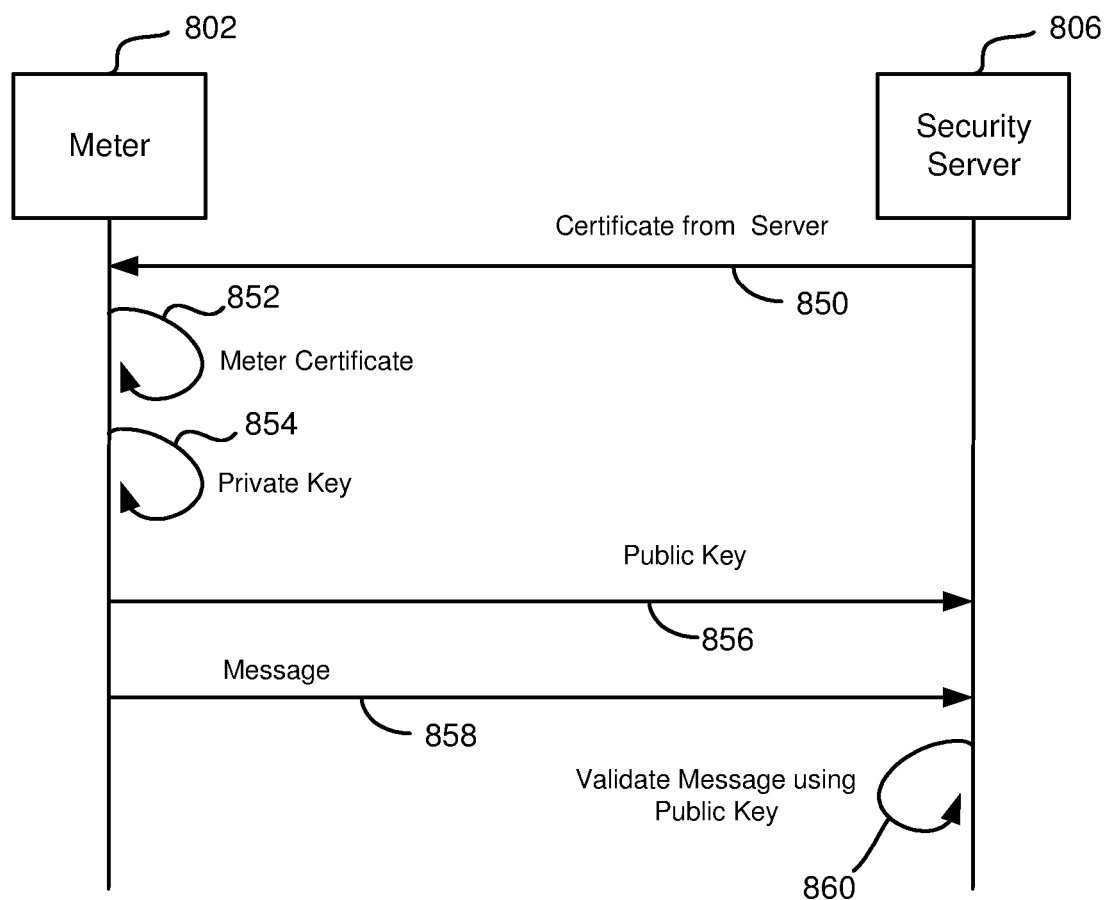
FIG. 8B illustrates an authentication method using certificates in accordance with an embodiment of the present disclosure.

Meter certificates may be improved by generating the certificate as part of a handshake procedure between the security server 806 and the meter 802. This would allow the meter 802 to establish the private key of the certificate and provide the public key to the security server 806, without a middleman holding the certificate, which may allow the certificate to be stolen. For example, referring to FIG. 8B, in step 850, the security server 806 generates a certificate 801 for meter 802 and transmits the certificate 801 to meter 802. When the meter 802 initially authenticates with the security server 806, the meter 802 may generate a second certificate 803 based on the security server's certificate 801, in step 852. The second certificate 802 would establish private keys 805 unique to the meter 802, in step 854, and the meter 802 would exchange the public information, e.g., a public key 807, back to the security server 806, in step 856. It is envisioned that other authentication methods, such as a static certificate, or username/password pairs, may be used for the initial handshake authentication.

Meter certificates may be improved by using the meter's client certificate 803 to sign the actual messages going to the security server 806. Such signing would allow the security server 806 to authenticate that each message sent by the meter is actually from the meter. For example, when the meter generates a message to send to the security server 806, the meter 802 may compute the hash of the message, generate a signature of the combination of the message and hash using the certificate's private key, and send the combined message and signature to the security server 806, in step 858. The security server 806 would then verify both the signature and hash to authenticate the message came from a valid meter, in step 860. For example, if either the message or hash has been changed, the signature generated at the server 806 for verification will not match the signature generated at the meter 802. Such validation may be done with the public keys in either a single shared certificate arrangement, or unique meter generated certificate arrangement.

Meter certificates may be further improved by requiring the security server 806 to provide a certificate to the meter 802 when the meter 802 connects. As without it, an attacker may imitate the security server 806, and trick the meter 802 into connecting. Emulating the security server 806 may allow the attacker to authenticate invalid user credentials, or even collect valid user credentials. One implementation of this may be to configure the meter with the public keys of the security server's certificate. Another implementation may be to use a certificate chain, and sign the security server's certificate with a Certificate Authority trusted by the meter.

Another solution to authenticating the meter with the security server, may be to use a Secure Connection between the meter and the security server, e.g., an encrypted tunnel such as an SSL tunnel between the meter and security server. It is envisioned that such a Secure Connection would mitigate eavesdropping by an attacker, would mitigate an attacker sending faked commands and queries, and would limit an attacker's ability to run a fake security server.

One implementation of a Secure Connection may be to use SSL/TLS between the meter, e.g., meters 602, 604, 702, 704, 802, and security server, e.g., server 606, 706, 806. For example, when the meter initiates a connection to the security server, the meter may start with a TLS handshake, and only continue with the actual commands and queries to the security server once the Secure Connection Tunnel has been established. It is envisioned that once the Secure Connection Tunnel has been established, the normal protocol between the meter and security server would be used.

SSL/TLS Secure Connections may be improved by requiring that the security server provide a valid certificate during the SSL/TLS handshake to the meter. For example, if the security server 806 does not provide a certificate which the meter 802 recognizes as valid, the meter 802 may assume the security server 806 is invalid or being impersonated, and reject the connection. Otherwise, the meter 802 would assume the security server 806 is valid, and continue.

SSL/TLS Secure Connections may be improved by requiring that the meter 802 provide a valid certificate during the SSL/TLS handshake to the security server 806. For example, if the meter does not provide a certificate which the security server recognizes as valid, the security server may assume the meter is invalid or being impersonated, and reject the connection. Otherwise, the security server would assume the meter is valid, and continue.

Another implementation of the Secure Connection may be to use IPSEC (Internet Protocol Security) between the meter and security server. For example, when the meter initiates a connection to the security server, the meter may use IPSEC to authenticate the meter to the security server, and vice versa.

IPSEC Secure Connections may be further improved by using the encrypted protocols of the IPSEC suite. For example, ESP, also known as Encapsulating Security Payload, may be used to provide encryption of the tunnel. It is acknowledged that ESP also provides authentication of the connection, and thus would also fulfill the role of Authenticated Headers.

Another implementation of the Secure Connection may be to use a VPN, or Virtual Private Network, Tunnel along the path between the meter and the security server. For example, the meter may establish a VPN tunnel to a hardware VPN appliance, which provides a bridge to the private network the security server is on. Security queries and commands would then be sent over the VPN Tunnel as normal. As another example, the meter may establish a VPN tunnel directly to the security server. It is appreciated that while non-encrypted and non-authenticated VPN tunnels are possible, encrypted and authenticated VPN tunnels are preferred.

It is to be appreciated that other centralized security configurations are contemplated to be within the scope of the present disclosure such as, but not limited to, Federated Identity, i.e., sharing login services across multiple applications, Single Sign On, Delegated Authority, i.e. using shared security tokens so nodes such as an application or the meter do not need access to the user's credentials, OAuth, Shibboleth, Kerberos Tokens, Multifactor authentication (MFA), i.e., using MFA in addition to user credentials to authenticate a user, etc.

While passwords are one of the most common and entrenched forms of credentials, in general memorized secrets, which includes passwords, pins, and other such sequences that a user must remember to prove who they are, passwords are vulnerable to compromise. The primary problem with such memorized secrets is that, due to the fact that they must be remembered by the user, they are often simple or repetitive, which makes guessing by hackers easier. Complexity rules often make the problem worse, as it only encourages users to choose easy to remember repetitive patterns.

One solution to the simplicity problem is to use authentication credentials other than memorized secrets. Credentials only need be something that proves that the user is who they claim that they are, the secret that only they possess.

One possible implementation of alternate forms of credentials may be a key which only the user may possess, stored on the user's computer, and transferred to the server/meter as proof of identity. It is to be appreciated that in one embodiment, the meter may act as the server, and the user's device (e.g., personal computer (PC), phone, mobile device, etc.) is the client, e.g., client 328. In other embodiments, as described above, the alternate forms of credentials may also apply to security between the meter 100/310/312/314/502/504/602/604/702/704/802 (i.e., as a client) and the security server (e.g. server 606, 706, 806). All verification of the credentials may be done by the meter or by another security server (with the meter as a middleman), as has been previously described.

While such a key may be similar to a password, without the need for memorization, length and complexity may be much greater; as well as allowing automated generating and distribution. For example, a hidden file on the user's computer may contain a secret key, such as "iD23oi(*&3243987dfs", shared between the server (or meter) and client similar to a password. As another example, because the key would not need to be memorized by a user, the key may be thousands of characters long. As another example, the key may be binary rather than text, as it would not need to be typed in by a user.

Such a stored credential may be improved by allowing it to be a security certificate, where instead of sharing the certificate, only the authority chain of the certificate would need to be shared. For example, the server may be configured with the public keys of a root certificate, and each user's certificate created from that root certificate. Each certificate would then be distributed to the users, to be later used when logging in to the server and/or meter.

Such credentials stored on a user's computer, e.g., client 328, suffer from the risk of compromise, either if the computer is left unattended, or hacked. One possible solution to stored credentials is to encrypt the stored credentials. Access to such an encrypted storage would still require entry of credentials; however, as such an encrypted storage would be local only, the risk of compromise of the credentials for access to the encrypted storage would be less than a public facing server. As such, it may be a memorized secret; though it is envisioned that any other alternative credentials may be used as well. For example, when the user needs to provide credentials to a server or meter, instead of entering the credentials to the server/meter, the user would provide the credentials to the encrypted storage on the user's local device, e.g., client 328, from which the client device would extract the credentials to the server/meter.

Such an encrypted storage may be improved by storing multiple credentials for multiple services, such as a keyring or password manager. For example, the user's credentials to server/meter A, B, and C may all be stored in the encrypted storage on the user's device, e.g., client 328, and the appropriate credentials extracted based on some identifying feature of the server/meter, such as a unique id or tag.

Such an encrypted storage may be improved by allowing the client software access to interface with the encrypted storage. In this embodiment, the user would enter the credentials to the encrypted storage into the client software. The client software would then request the server/meter credentials from the encrypted storage using the user's entered credentials; then those extracted server credentials would be sent to the server/meter for authentication.

Another possible solution to stored compromise/credentials is to store the credentials on an external device. Such a physical external device may be carried around by the user, with the added benefit of allowing the stored credentials to be used on multiple client devices. For example, a file system on a USB stick, hard drive, DVD, or other mobile storage media, may contain the credentials file. As another example, a dedicated USB device may give out the stored credentials using a USB command. As another example, such a physical device may also contain an encrypted storage as described earlier. In this embodiment, the external device may be coupled to the user's client device, where the client device may extract the credentials and forward the credentials to the server/meter.

Such a solution may be improved by requiring physical input on the device storing the credentials, and only allow access to the stored credentials when that input enables it. For example, the device may have a button that must be pressed within 30 second of credential request, or physically held down, for the credential storage to be accessible. As another example, the device may have a pin entry pad, and only unlock if the correct pin is entered.

Another solution to stored compromise is for the credentials to be dynamically generated, in such a way that both the credential storage and the server/meter agree on what the dynamic credentials should be, without transmitting that secret beforehand. In one embodiment, a seed token may be transmitted from the server/meter on request, then used by the client to generate a new dynamic password when combined with the static previously shared credentials. For example, when the client, e.g., client 328, requests to login, the server/meter, e.g., meter 100/310/312/314/502/504/602/604/702/704/802, sends an out of band message to the client with a dynamic token. The client then has 30 seconds to combine the token with the pre-shared credentials and send back a dynamically generated key to the server/meter. The server/meter then authenticates both the pre-shared credentials, and the dynamic key included. As another example, in such a system, the dynamic token may be used as a key in encrypting the pre-shared credentials.

Another possible implementation of dynamic credentials may be one based on a common frame of reference that doesn't need to be transmitted between client and server/meter, such as time of day. For example, the time may be used as a token, adjusted or rounded to account for time between computation on the client and verification on the server/meter. As another example, the time may be used as the seed in generating the token. As another example, a common protocol such as TOTP, Time-based One-time Password, may be used to generate a one-time credential. In addition to using such tokens as credentials with the server/meter, the tokens may also be used as seed tokens to be combined with the pre-shared credentials, as described earlier.

Another implementation of alternative credentials may be out of band information which can only be received by the user. In particular, this helps mitigate the problem of stored credentials on the client, and instead relies on the security of the transmission media to communicate the out of band information. For example, an email may be sent to that user, containing a token, which may then be supplied to the server/meter as proof of identity. As another example, an SMS text message may be sent. As another example, a UDP or TCP message on a shared port may be sent to the client; perhaps as a message to the client directly, or as a message to a secondary application, from which the token is copied. As another example, the token may be displayed on the screen of the server/meter in the location of the physical server/meter, which may then be entered by the user, thus proving that the user is in the location of the server/meter. As another example, a camera of a phone or other mobile device may be used to read the information from the display of the server/meter, either using Optical Character Recognition (OCR), or another image based data transfer method, such as QR Code. As another example, speakers on the server/meter may emit a tone, and a microphone of the phone of the user may receive and use the pitch, or the sequence of tones, as a token to send to the server/meter.

Another implementation of alternative credentials may be biometric credentials. In such a system, either the whole biometric data, or a digital signature generated from such data, may be used as credentials. For example, the fingerprints of the user may be registered with the server/meter and used as credentials. As another example, the iris of the user may be used. As another example, the voice pattern of the user may be used. As another example, facial recognition of the user's face may be used.

Such voice biometrics may be improved by requiring that the user read a specific dynamic token, and both the voice pattern, and the speech to text analysis, may be used for verification. For example, the user may be asked to read "the dog", and both their voice pattern would be analyzed, and the words "the dog" detected. It is envisioned that in such a system, repeated attempts with different words may be allowed to aid recognition.

Another implementation of alternative credentials may be human authentication by an already authenticated user. For example, after User A logs into the system/meter (e.g., meter 100/310/312/314/502/504/602/604/702/704/802), User B attempts to log in to the system/meter. User B then calls User A (or contacts User A by other means such as a SMS text message), and requests to be authenticated. User A verifies the identity of User B, and signals the system/meter to allow User B access, perhaps but not limited to, by sending a secure command to the system/meter (e.g., meter 100/310/312/314/502/504/602/604/702/704/802) from User A's device, e.g., client device 328. As another example, when User B calls User A, User A gets a token from the system/meter, which they supply to User B as dynamic credentials to log in to the system/meter.

Human authentication may be extended by using it for authorization as well. For example, after User B has already been authenticated and User B wishes to perform a secure action, such as updating firmware, User B may notify User A, such as by a phone call or application message. User A would then authorize User B to perform that secure action, e.g., by sending a secure message to the server/meter. It is envisioned that such authorization would be temporary in nature, either for the length of User B's login session, or for a configured time period, but this is not required.

No matter how strong a credential is, it can always be compromised: Devices can be stolen, faces can be faked, messages can be intercepted, passwords can be guessed. One solution is to require multiple credentials to authenticate a user's identity, also known as multi-factor authentication (MFA). Each additional credential required lowers the risk of any one credential being compromised; only when all credentials are compromised is the user compromised.

In one embodiment, multiple credentials may be to require multiple memorized secrets. For example, the user may be required to enter to the server/meter a password, and the answer to a personalized question. As another example, the user may be required to enter two passwords, or one password and a pin. It is envisioned that any number of credentials may be required, based on the requirements of the system including the server, meter and/or client.

In another embodiment, multiple credentials may be to require two or more of any type of alternate credential. For example, the user may be required to enter a password, and supply a biometric id such as a fingerprint scan. As another example, the user may be required to enter a password to the server/meter, and the client software may send a stored credential, either stored on the computer being used, or a dedicated physical device, where the server/meter may validate the stored credential.

Such embodiments of multiple credentials may be improved by requiring credentials of differing classifications. Since a password and a pin are both memorized secrets, both can be guessed or leaked. Since stored credentials exist on a device, requiring multiple stored credentials can be compromised if those devices are stolen. By requiring the user to provide credentials of differing types, such as a password and a stored credential, the compromise of any one type of credential does not explicitly compromise the others. For example, passwords and stored credentials would be of differing types, but stored and dynamic credentials, if they come from the same device, would not.

In another embodiment of using multiple credentials, a subset of credentials may be required after the initial identity has been authenticated. This may improve user experience and ease adoption by minimizing repetitive entry of credentials. For example, a password and stored credentials may be required on initial login, but only stored credentials when accessing a feature, such as configuring meter profiles, that requires confirmation of identity. As another example, a password and face recognition may be required on initial login, but only face recognition when accessing such a feature.

Such an implementation of multiple credentials may be extended by allowing different users or roles to require differing types of credentials. For example, low security roles and users may require only a password to login, but high security roles and users may require a password, stored credential, and dynamic credential. As another example, the requirement of dynamic credentials may be added to users as physical devices were rolled out by IT to users.

Such an implementation of multiple credentials may be further extended by allowing differing features to require differing credentials. For example, login may require only a password, but updating settings, even if the user has already been configured with the permission to update settings, may require a dynamic credential. As another example, update of settings may require an additional password, different from the password used by the user during login.

Such an implementation of multiple credentials may be further extended by allowing users to select different types of credentials from each other. For example, User A may select to use a password and stored credential, and User B may use biometrics and dynamic credentials. It is envisioned that such a system may improve security for forcing any hacker to guess which type of credential is used, in addition to determining the credentials themselves.

Such an implementation of multiple credentials may be improved by using common multi-factor authentication protocols and solutions. Such common protocols and solutions may include, but are not limited to, Google Authenticator, Authy, Duo, OKTA, RSA SecureID, LastPass, AuthO, YubiKey.

Figure 9:
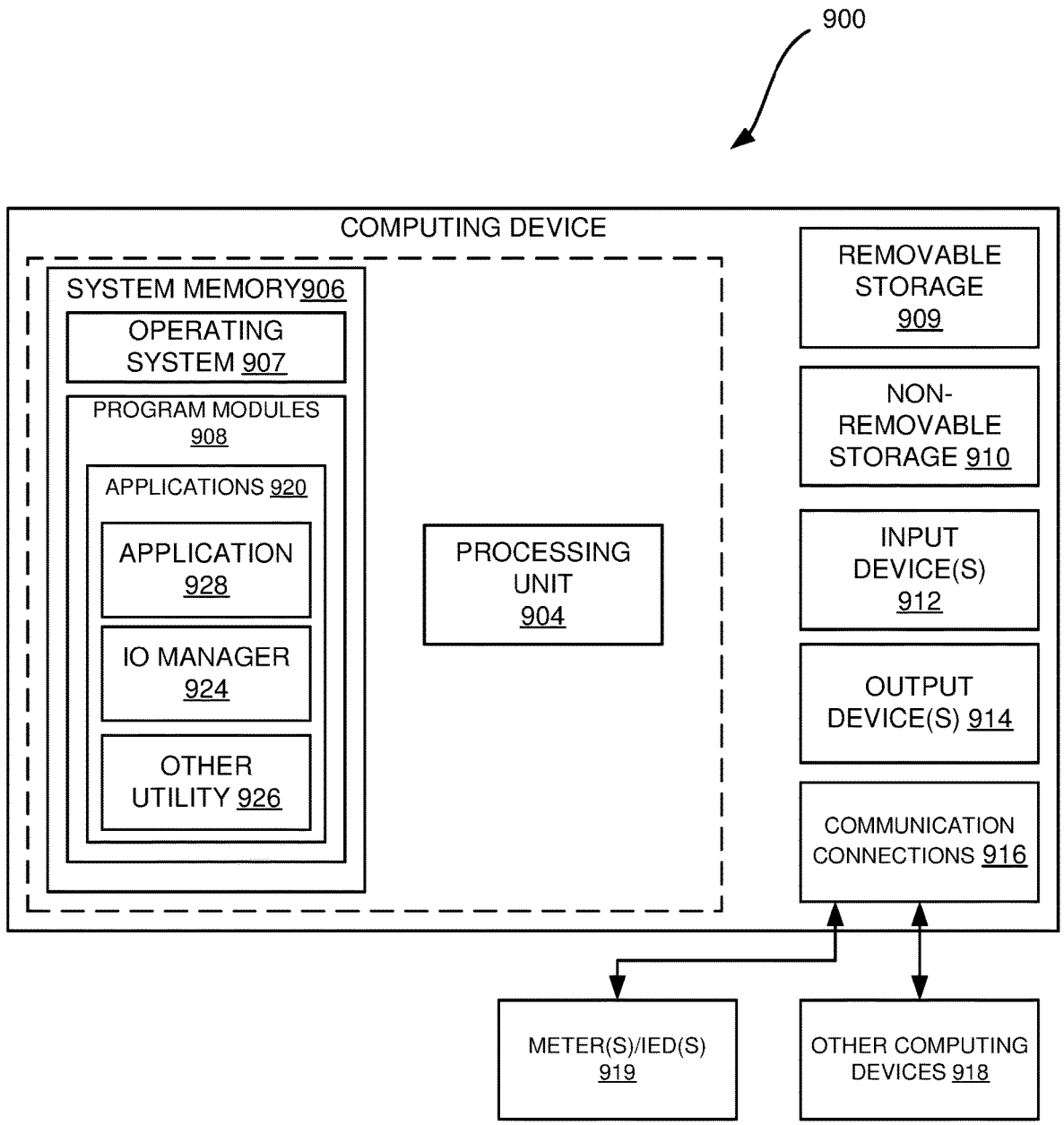
FIG. 9 is a block diagram of an exemplary computing device in accordance with an embodiment of the present disclosure.

FIG. 9 is a block diagram illustrating physical components of a computing device 902, for example a client computing device (such as client 328), a server (such as security server 606/706/806), or any other computing device, with which examples of the present disclosure may be practiced. In a basic configuration, the computing device 902 may include at least one processing unit 904 and a system memory 906. Depending on the configuration and type of computing device, the system memory 906 may comprise, but is not limited to, volatile storage (e.g., random access memory), non-volatile storage (e.g., read-only memory), flash memory, or any combination of such memories. The system memory 906 may include an operating system 907 and one or more program modules 908 suitable for running software programs/modules 920 such as 10 manager 924, other utility 926 and application 928. As examples, system memory 906 may store instructions for execution. Other examples of system memory 906 may store data associated with applications. The operating system 907, for example, may be suitable for controlling the operation of the computing device 902. Furthermore, examples of the present disclosure may be practiced in conjunction with a graphics library, other operating systems, or any other application program and is not limited to any particular application or system. This basic configuration is illustrated in FIG. 9 by those components within a dashed line 922. The computing device 902 may have additional features or functionality. For example, the computing device 902 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 906. While executing on the processing unit 904, program modules 908 (e.g., Input/Output (I/O) manager 924, other utility 926 and application 928) may perform processes including, but not limited to, one or more of the stages of the operations described throughout this disclosure. For example, one such application 928 may implement the administrative security configuration software 509 shown and described in relation to FIG. 5. In another example, one such application 928 may implement the security management software 720 shown and described in relation to FIG. 7. Other program modules that may be used in accordance with examples of the present disclosure may include electronic mail and contacts applications, word processing applications, spreadsheet applications, database applications, slide presentation applications, drawing or computer-aided application programs, photo editing applications, authoring applications, etc. It is to be appreciated that several modules or applications 928 may be execute simultaneously or near simultaneously and may share data. For example, an application 928 such as a Security Information and Event Management (SIEM) application may receive data from a logging application and use such data to perform an analysis as described above. As another example, an application 928 such as an Intrusion Detection System (IDS) application may receive data from another application, such as a logging application, the security management software 720, etc., and use such data to perform an analysis as described above.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 1302 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the present disclosure may be practiced within a general purpose computer or in any other circuits or systems.

The computing device 902 may also have one or more input device(s) 912 such as a keyboard, a mouse, a pen, a sound input device, a device for voice input/recognition, a touch input device, etc. The output device(s) 914 such as a display, speakers, a printer, etc. may also be included. The aforementioned devices are examples and others may be used. The computing device 904 may include one or more communication connections 916 allowing communications with other computing devices 918 (e.g., external servers 607) and/or meters/IEDs 919 (e.g., IEDs 100/310/312/314/502/504/602/604/702/704/802). Examples of suitable communication connections 1316 include, but are not limited to, a network interface card; RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 906, the removable storage device 909, and the non-removable storage device 910 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 902. Any such computer storage media may be part of the computing device 902. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is to be appreciated that the various features shown and described are interchangeable, that is a feature shown in one embodiment may be incorporated into another embodiment. It is further to be appreciated that the methods, functions, algorithms, etc. described above may be implemented by any single device and/or combinations of devices forming a system, including but not limited to meters, IEDs, servers, storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One may implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A system comprising:
a network for coupling devices and enabling the transmission of data between the devices;
at least one security server coupled to the network including a first memory, the first memory configured to store security configurations for a plurality of meters; and
the plurality of meters, each meter of the plurality of meters including:
a communication device for coupling the meter to the network and receiving the security configuration for the meter, and
a second memory for storing the security configuration in a local database,
wherein the security server sends a notification to each meter when a security configuration has changes and the meter pulls the changed security configuration after receiving the notification, the notification being sent via at least one of a Modbus command and/or a HTTP POST command.

2. The system of claim 1, wherein the first memory further includes a mapping of each meter to security credentials of individual users.

3. The system of claim 1, wherein the communication device of each meter is configured to pull the security configuration from the security server without the security server knowing the network address of the meter.

4. The system of claim 1, wherein the notification is broadcast as a UDP (user datagram protocol) message to the plurality of meters.

5. The system of claim 1, wherein the security configuration for each meter includes a device profile for the meter, the device profile including security and non-security parameters.

6. The system of claim 5, wherein the device profile is configured via a Lightweight Directory Access Protocol (LDAP) setting profile of the meter.

7. The system of claim 1, wherein the security configuration is a single list of user credentials applicable to each meter.

8. The system of claim 7, wherein the list identifies which specific meter of the plurality of meters a specific user has access to.

9. The system of claim 1, wherein the security configuration includes a plurality of users arranged in at least one group, access permissions to the plurality of meters being based on the at least one group.

10. The system of claim 9, wherein the at least one groups is configured via Windows Active Directories and features of the meter are managed as Active Directory objects.

11. The system of claim 1, wherein the communication device transmits a security event to the security server for storage in a log.

12. A system comprising:
a network for coupling devices and enabling the transmission of data between the devices;
at least one security server coupled to the network including a first memory, the first memory configured to store security configurations for a plurality of meters; and
the plurality of meters, each meter of the plurality of meters including:
a communication device for coupling the meter to the network and receiving the security configuration for the meter, and
a second memory for storing the security configuration in a local database, wherein the communication device transmits a security event to the security server for storage in a log and the security event is transmitted via a Lightweight Directory Access Protocol (LDAP).

13. The system of claim 12, wherein the log is fed into a security information and event management (SIEM) system for analysis, wherein the SIEM system generates an alert based on at least one of when a specified event is detected, a threshold of event occurrences has been exceeded and/or a combination of events has occurred.

14. The system of claim 12, wherein the log is fed into an intrusion detection system (IDS) for analysis, wherein the IDS system generates an alert based events indicative of an intrusion by an attacker.

15. An electric power meter comprising:
at least one sensor coupled an electrical power distribution system, the at least one sensor configured to measure at least one parameter of the electrical power distribution system and generate at least one analog signal indicative of the at least one parameter;
at least one analog-to-digital converter configured to receive the at least one analog signal and convert the at least one analog signal to at least one digital signal;
at least one processor configured to receive the at least one digital signal and calculate at least one power parameter of the electrical power distribution system; and
a communication device for coupling the meter to a network, querying a security server for user credentials upon a user attempting to log into the meter and retrieving the user credentials,
wherein the at least one processor compares the retrieved user credentials to credentials used in the log in attempt to grant access to the meter,
wherein the at least one processor transmits a security event to the security server for storage in a log and
wherein the security event is transmitted via a Lightweight Directory Access Protocol (LDAP).

16. The meter of claim 15, wherein the at least one processor caches the retrieved user credentials in a memory of the meter and requeries the security server upon the retrieved user credentials expiring.

17. The meter of claim 16, wherein the at least one processor limits the number of user credentials stored in the memory.

18. A system comprising:
a network for coupling devices and enabling the transmission of data between the devices;
at least one security server coupled to the network including a first memory, the first memory configured to store security configurations for a plurality of meters; and
the plurality of meters, each meter of the plurality of meters including:
a communication device for coupling the meter to the network and receiving the security configuration for the meter, and
a second memory for storing the security configuration in a local database,
wherein the security server sends a notification to each meter when a security configuration has changes and the meter pulls the changed security configuration after receiving the notification, the notification being broadcast as a UDP (user datagram protocol) message to the plurality of meters.

19. A system comprising:
a network for coupling devices and enabling the transmission of data between the devices;
at least one security server coupled to the network including a first memory, the first memory configured to store security configurations for a plurality of meters; and
the plurality of meters, each meter of the plurality of meters including:
a communication device for coupling the meter to the network and receiving the security configuration for the meter, and
a second memory for storing the security configuration in a local database,
wherein the security configuration for each meter includes a device profile for the meter, the device profile including security and non-security parameters, and
wherein the device profile is configured via a Lightweight Directory Access Protocol (LDAP) setting profile of the meter.

20. A system comprising:
a network for coupling devices and enabling the transmission of data between the devices;
at least one security server coupled to the network including a first memory, the first memory configured to store security configurations for a plurality of meters; and
the plurality of meters, each meter of the plurality of meters including:
a communication device for coupling the meter to the network and receiving the security configuration for the meter, and
a second memory for storing the security configuration in a local database,
wherein the security configuration includes a plurality of users arranged in at least one group, access permissions to the plurality of meters being based on the at least one group, and
wherein the at least one groups is configured via Windows Active Directories and features of the meter are managed as Active Directory objects.

21. The system of claim 1, wherein the plurality of meters includes at least one of a socket/S-base meter, a panel meter, a switchboard/draw-out meter and/or a A-base meter.

22. The system of claim 12, wherein the plurality of meters includes at least one of a socket/S-base meter, a panel meter, a switchboard/draw-out meter and/or a A-base meter.

23. The system of claim 18, wherein the plurality of meters includes at least one of a socket/S-base meter, a panel meter, a switchboard/draw-out meter and/or a A-base meter.

24. The system of claim 19, wherein the plurality of meters includes at least one of a socket/S-base meter, a panel meter, a switchboard/draw-out meter and/or a A-base meter.

25. The system of claim 20, wherein the plurality of meters includes at least one of a socket/S-base meter, a panel meter, a switchboard/draw-out meter and/or a A-base meter.

* * * * *